United States Patent
Døssing et al.

(10) Patent No.: US 12,361,017 B2
(45) Date of Patent: Jul. 15, 2025

(54) NODAL REDUNDANCY STORAGE DECISIONS

(71) Applicant: CrowdStrike, Inc., Sunnyvale, CA (US)

(72) Inventors: Stig Rohde Døssing, Aarhus (DK); Kenn Daniel, Aarhus (DK)

(73) Assignee: CrowdStrike, Inc., Sunnyvale, CA (US)

(*) Notice: Subject to any disclaimer, the term of this patent is extended or adjusted under 35 U.S.C. 154(b) by 0 days.

(21) Appl. No.: 18/460,785

(22) Filed: Sep. 5, 2023

(65) Prior Publication Data

US 2025/0077545 A1    Mar. 6, 2025

(51) Int. Cl.
  *G06F 16/27*    (2019.01)
  *G06F 16/215*    (2019.01)

(52) U.S. Cl.
  CPC ............ *G06F 16/27* (2019.01); *G06F 16/215* (2019.01)

(58) Field of Classification Search
  CPC .............................. G06F 16/27; G06F 16/215
  See application file for complete search history.

(56) References Cited

U.S. PATENT DOCUMENTS

| | | | |
|---|---|---|---|
| 6,826,601 B2 | 11/2004 | Jacobs et al. | |
| 7,631,052 B2 | 12/2009 | Fein et al. | |
| 8,832,372 B2 | 9/2014 | Jibbe et al. | |
| 9,354,991 B2 | 5/2016 | Bennett et al. | |
| 9,569,319 B2 | 2/2017 | Miller et al. | |
| 9,607,004 B2* | 3/2017 | Haustein | G06F 16/119 |
| 10,063,256 B1 | 8/2018 | Henriksen | |
| 10,175,914 B2* | 1/2019 | Ross | G06F 16/173 |
| 11,086,553 B1 | 8/2021 | Fisher | |
| 2016/0006461 A1 | 1/2016 | Yin et al. | |
| 2021/0191634 A1* | 6/2021 | Zafman | G06F 3/061 |
| 2023/0018773 A1* | 1/2023 | Sudevalayam | G06F 3/0611 |

FOREIGN PATENT DOCUMENTS

| | | |
|---|---|---|
| CN | 102799659 | 1/2015 |
| GB | 2443442 | 7/2008 |
| WO | 2015/177505 | 11/2015 |
| WO | 2019/155308 | 8/2019 |

OTHER PUBLICATIONS

European Search Report mailed Feb. 3, 2025 for European Patent Application No. 24196612.6, 10 pages.

* cited by examiner

*Primary Examiner* — Apu M Mofiz
*Assistant Examiner* — Oscar Wehovz
(74) *Attorney, Agent, or Firm* — Law Office of Scott P. Zimmerman, PLLC

(57) ABSTRACT

Nodal redundancy storage decisions efficiently distribute redundant copies of electronic data. A cloud computing network establishes a policy that governs how and where the redundant copies are stored within the cloud computing network (such as by region, zone, and cluster targets). Each cloud computing node is then delegated, with autonomy, to manage a redundant copy to achieve the policy established by the cloud computing network. Each cloud computing node may independently and individually decide to store, to not store, or to evict the redundant copy without consensus of other nodes and without consultation or instruction from the cloud computing network. The nodal redundancy storage decisions are thus decentralized from region, zone, and cluster management.

20 Claims, 22 Drawing Sheets

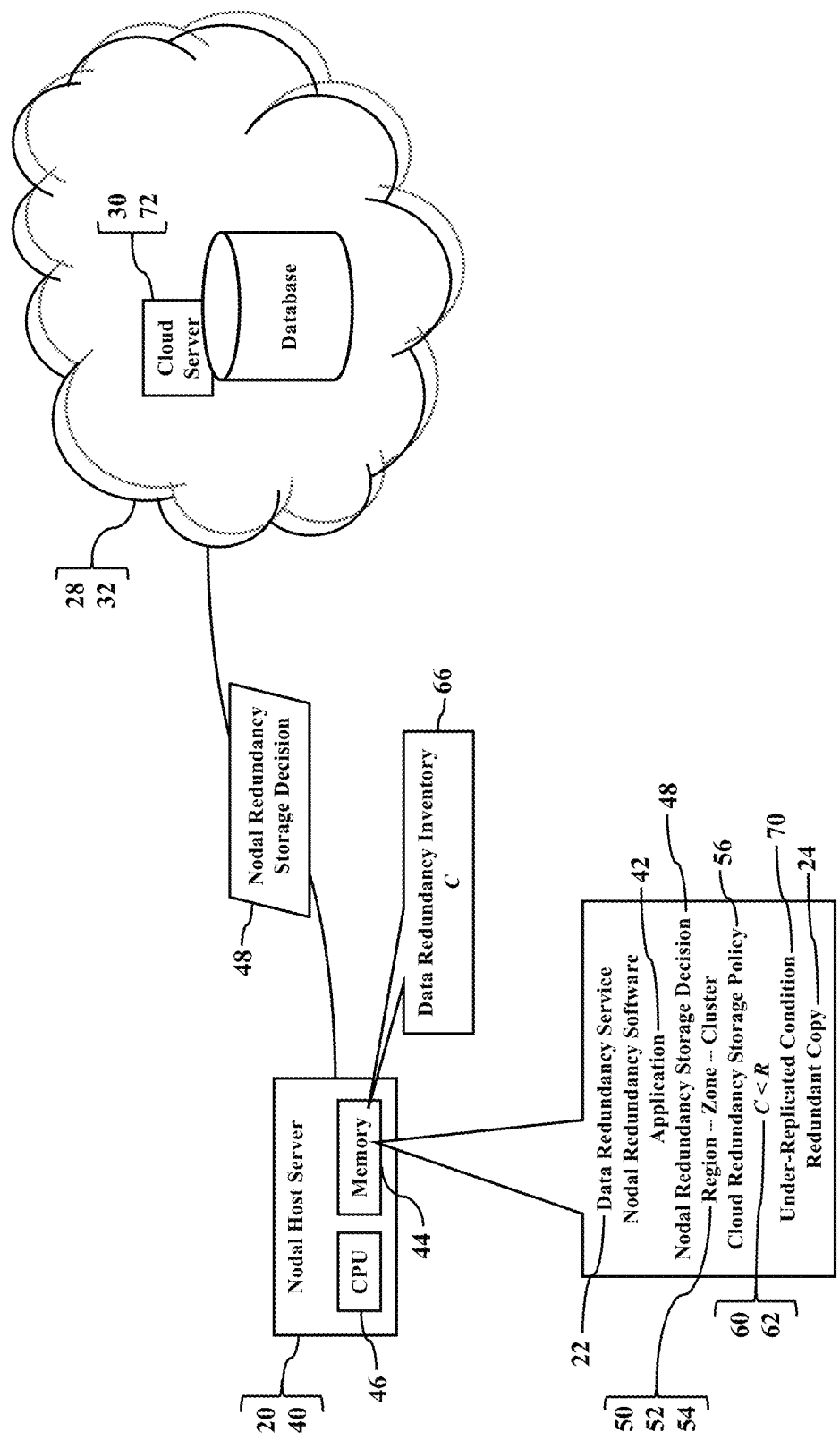
FIG. 5A/21

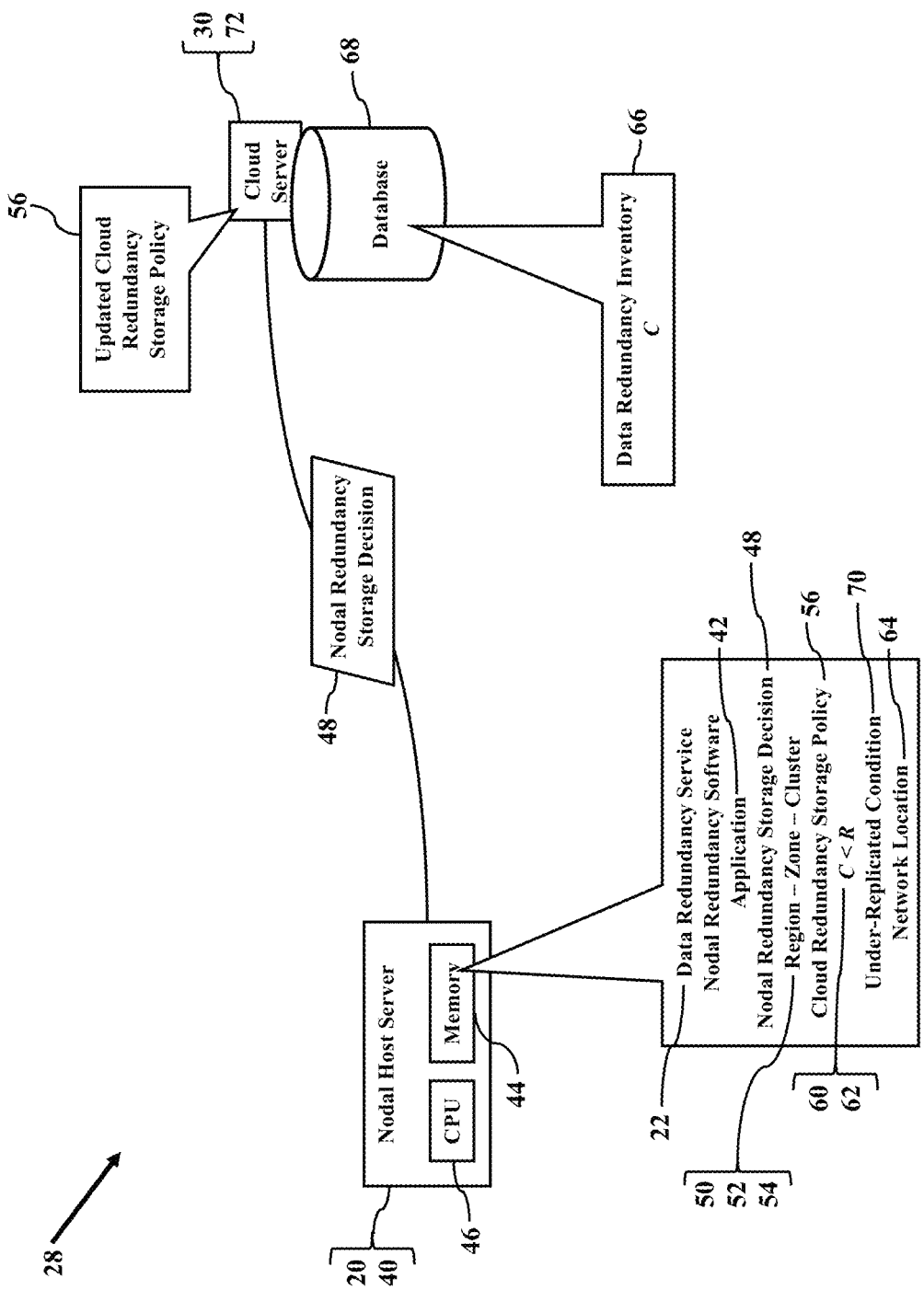
FIG. 6/21

NODAL REDUNDANCY STORAGE DECISIONS

BACKGROUND

The subject matter described herein generally relates to computers and to computer networks and, more particularly, the subject matter relates to data redundancy in hardware.

Data centers and other networks implement data redundancy mechanisms. Redundant copies of data are maintained to ensure availability and reliability. Maintaining redundant copies of data, though, creates expensive networking problems. The redundant copies of data cause network congestion and consume precious network bandwidth. The redundant copies of data also require excessive computer resources that degrade computer hardware performance and network performance. Data redundancy mechanisms should thus only be performed when needed.

SUMMARY

Nodal redundancy storage decisions efficiently distribute redundant copies of electronic data. A cloud computing network establishes a policy that governs how and where the redundant copies are stored within the cloud computing network (such as by region, zone, and cluster targets). Each individual cloud computing node is then delegated, with complete autonomy, to manage a redundant copy to achieve the policy established by the cloud computing network. Each cloud computing node, in other words, may independently decide, for itself, whether to store, or to evict, the redundant copy. The cloud computing node need not establish a voting consensus with other nodes, and the cloud computing node may establish minimal coordination with the cloud computing network. For instance, the cloud computing node may merely convey its intention to store the redundant copy and await approval from the cloud computing network. Management of the policy is thus decentralized from region, zone, and cluster control and, instead, pushed down and delegated to each individual cloud computing node.

BRIEF DESCRIPTION OF THE SEVERAL VIEWS OF THE DRAWINGS

The features, aspects, and advantages of cloud-based data redundancy are understood when the following Detailed Description is read with reference to the accompanying drawings, wherein:

FIGS. 5A-8 illustrate examples of conditional redundancy;

DETAILED DESCRIPTION

Some examples relate to redundant copies of electronic data. As we all know, it's best that we regularly backup our computers, smartphones, and other devices. Backups help prevent data loss. The same best practices are also true for computer networks. Cloud providers of cloud services (such as ZOOM® conferencing, MICROSOFT OFFICE 365®, and APPLE ICLOUD®) must also maintain backup copies of electronic data. Indeed, a cloud computing network usually maintains multiple redundant copies to ensure data integrity and availability. The cloud computing network, though, may have hundreds or even thousands of nodes (such as servers and other devices) that store electronic data. Storing redundant copies of data among these hundreds or thousands of nodes, though, congests the cloud computing network with packet traffic and greatly consumes computer hardware and software resources. This disclosure, instead, describes elegant examples of nodal redundancy storage decisions that are implemented by each individual cloud computing node. Each cloud computing node is authorized and empowered to manage one or more respective redundant copies, if any, of electronic data. That is, instead of having some form of centralized management, each individual cloud computing node may decide, for itself, whether to store, to not store, or to evict the redundant copy. The cloud computing network simply establishes a policy that governs how and where the redundant copies are stored within the cloud computing network (such as by region, zone, and cluster targets). The cloud computing network also distributes an inventory of the network locations currently storing the redundant copies and the cloud computing nodes intending to store more redundant copies. Each cloud computing node is then delegated, perhaps with complete autonomy, in some examples, to manage its operations to achieve the policy. Each cloud computing node, for example, may independently and individually decide, for itself, whether to store, to not store, or to evict the redundant copy. The cloud computing node need not establish a voting consensus with other nodes. The cloud computing node makes its storage decision (e.g., a decision to store, not store, move, or delete) and informs the cloud computing network. As long as the storage/eviction decision doesn't conflict with a different storage/eviction decision, then the cloud computing node executes its storage decision on the redundant copy. If, however, the storage/eviction decision does create a conflict, the cloud computing network may utilize inventory matching as a tie-breaker mechanism (as later paragraphs explain). The cloud computing node thus merely operates within the guardrails established by the policy. Management and achievement of the policy is thus decentralized and delegated to each individual cloud computing node.

Figure 1:
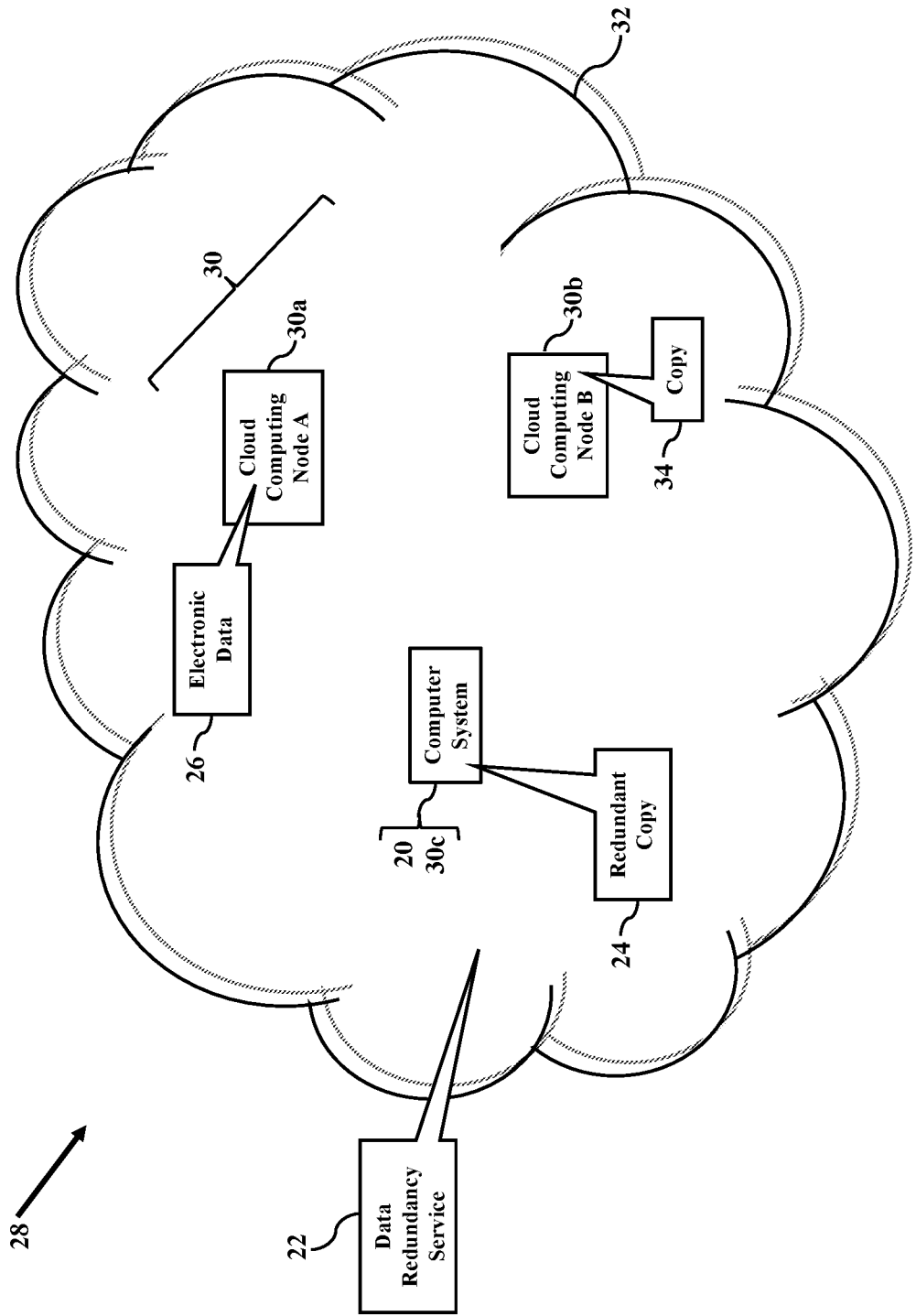
FIGS. 1-3 illustrate some examples of data redundancy.
Figure 2:
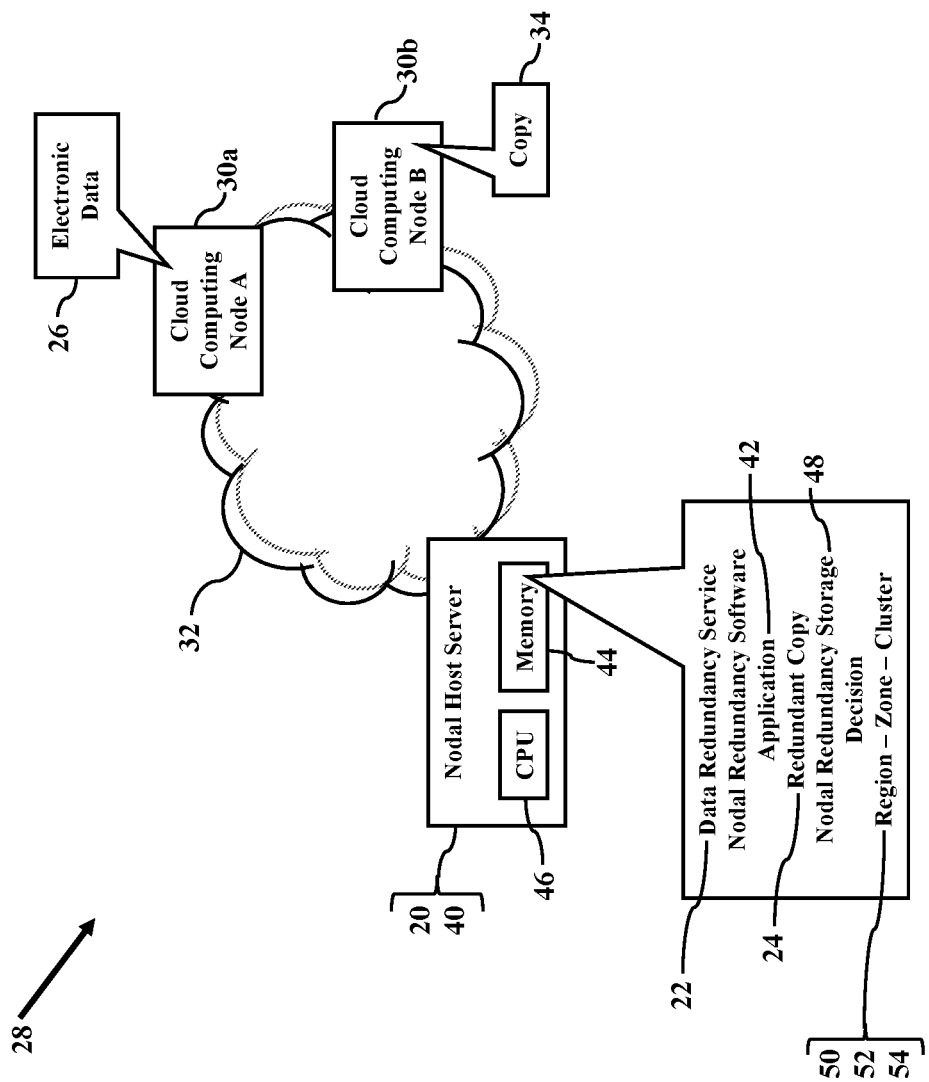
Figure 3:
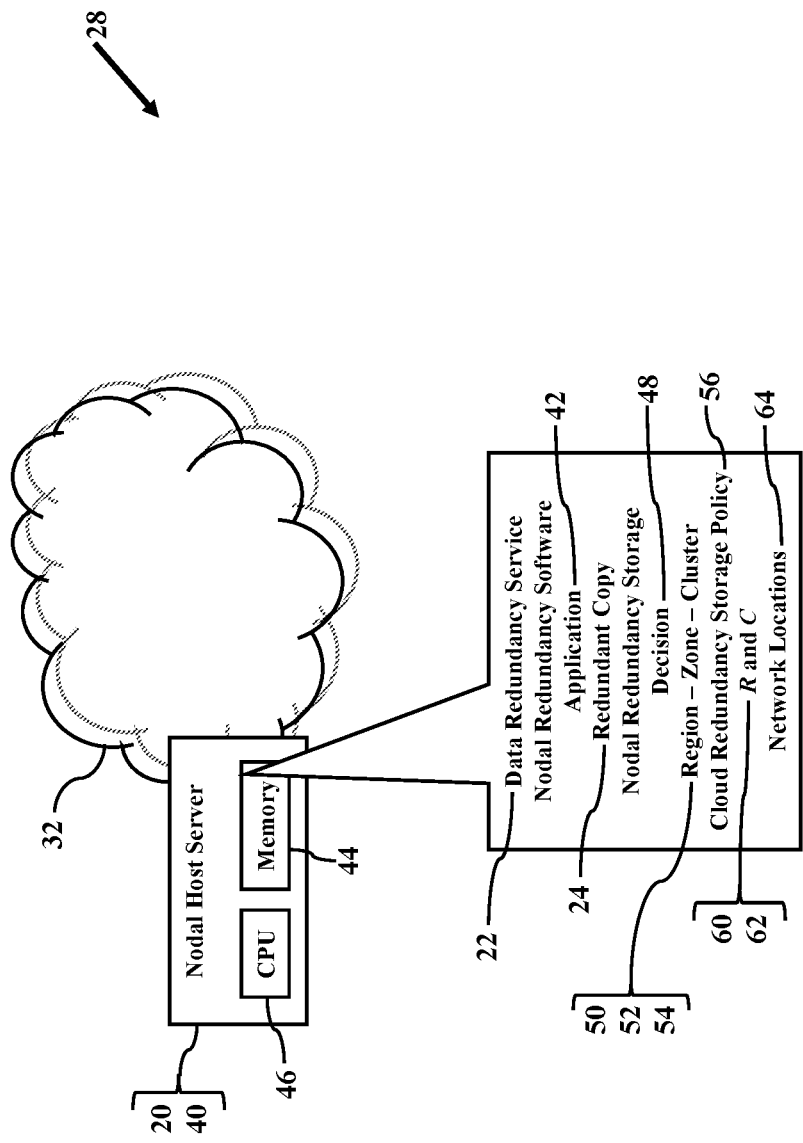

FIGS. 1-3 illustrate some examples of data redundancy. A computer system 20 participates in a data redundancy service 22. The computer system 20 is programmed to autonomously decide whether to store, or whether to evict, a redundant copy 24 of any electronic data 26. The electronic data 26, for example, may be a computer file (e.g., a photo, movie, or music) and associated with a filename. The electronic data 26, though, may only be a portion or part of a file, for example, a spreadsheet column/row shard. The electronic data 26, however, may be any data segment, element, object, or structure regardless of size or content. Whatever the bits/bytes making up the electronic data 26, best practices often require multiple copies of the electronic data 26 to ensure data integrity and availability.

FIG. 1 illustrates the data redundancy service 22. In this example, a cloud computing network 28 distributes and stores multiple copies of the electronic data 26. The cloud computing network 28 may have several, or even many, servers, routers, switches, devices, computers, or other cloud computing nodes 30 that communicatively interface via communications networks 32 (e.g., public Internet, private network, and/or hybrid network). As a simple example, suppose a first cloud computing node 30*a* stores a true or original version of the electronic data 26. A second cloud computing node 30*b* stores a copy 34 of the electronic data 26. As best practices, the cloud computing network 28 may require yet another redundant copy 24 of the electronic data 26. In this example, then, the computer system 20 decides, for itself, whether to locally store the second, redundant copy 24 of the electronic data 26. FIG. 1 illustrates the computer system 20 as yet a third cloud computing node 30*c*, and the cloud computing node 30*c* autonomously decides whether it stores the redundant copy 24. The cloud computing network 28 provides the data redundancy service 22 by distributing and storing the multiple redundant copies 24 & 34 of the electronic data 26. The distributed, redundant copies 24 & 34 protect the electronic data 26 from loss or corruption. The computer system 20, as a service participant, autonomously decides, for itself, whether or not the computer system 20 should locally store or host the redundant copy 24.

As FIG. 2 illustrates, the computer system 20 is programmed for redundancy free will. FIG. 2 illustrates the computer system 20 as a nodal host server 40 operating within the cloud computing network 28. As the host server 40 receives electrical power and operates, the host server 40 hosts (e.g., locally stores and executes) a nodal redundancy software application 42. The host server 40 stores the nodal redundancy software application 42 in a local memory device 44, and at least one hardware processor 46 executes the nodal redundancy software application 42. The nodal redundancy software application 42 has programming code or instructions that cause the server 40 to perform operations, such as independently managing the redundant copy 24 without consensus with the other cloud computing nodes 30 of the cloud computing network 28. The nodal redundancy software application 42 autonomously generates a nodal redundancy storage decision 48. The nodal redundancy software application 42 decides whether or not the host server 40 should locally store or delete the redundant copy 24. The host server 40, in other words, is programmed with redundancy free will and acts as a sovereign agent on behalf of the cloud computing network 28 to locally manage its dynamic participation in the data redundancy service 22. No voting consensus mechanism is needed within a region 50, zone 52, and/or cluster 54 within the cloud computing network 28. No voting or other consensus mechanism is needed to elect the server 40 as a so-called leader of the region 50, zone 52, and/or cluster 54. No consensus mechanism is needed to elect the server 40 as a host of the redundant copy 24. The nodal redundancy software application 42, instead, instructs the server 40 to decide, for itself, whether the redundant copy 24 should be downloaded and stored to the local memory device 44. The nodal redundancy software application 42, in other words, self-decides to individually host/store the redundant copy 24. The nodal redundancy software application 42 self-determines whether to store the redundant copy 24, without centralized instruction or command from the region 50, zone 52, and/or cluster 54.

As FIG. 3 illustrates, the cloud computing network 28 may establish or specify a cloud redundancy storage policy 56. The cloud redundancy storage policy 56 specifies one or more governing rules, goals, and/or parameters associated with the data redundancy service 22. The nodal server 40 retrieves or downloads the cloud redundancy storage policy 56 and is then permitted to autonomously generate its nodal redundancy storage decision 48, as long as the nodal redundancy storage decision 48 conforms to the cloud redundancy storage policy 56. The nodal redundancy software application 42, in other words, need only stay within, or abide by, guardrails specified by the cloud redundancy storage policy 56. The nodal redundancy software application 42 may freely and independently retrieve and locally store the redundant copy 24, as long as those operations (e.g., query, retrieve, write) conform to the cloud redundancy storage policy 56. Conversely, if the server 40 is being decommissioned or being removed from the region 50, zone 52, and/or cluster 54 (for whatever reason), the redundant copy 24 may be evicted (e.g., transferred to or moved to or deleted from) another networked storage destination, again as long as the eviction/transfer conforms to the cloud redundancy storage policy 56. As another example, if the server 40 already locally stores the redundant copy 24, the nodal redundancy software application 42 may freely and independently evict or delete the redundant copy 24, again as long as those operations conform to the cloud redundancy storage policy 56.

As yet another example, the cloud redundancy storage policy 56 may set goals or objectives. Suppose the cloud redundancy storage policy 56 identifies how many redundant copies R (illustrated as reference numeral 60) that are required to be stored by the cloud computing network 28. The cloud redundancy storage policy 56 may even further specify how many of the redundant copies R are stored according to the region 50, zone 52, and/or cluster 54. The cloud redundancy storage policy 56 may also identify how many redundant copies C (illustrated as reference numeral 62) are currently stored by the cloud computing network 28. The cloud redundancy storage policy 56 may further specify the network locations 64 (e.g., the region 50, zone 52, cluster 54, and/or IP address) associated with each currently-existing redundant copy. The nodal redundancy software application 42 may thus instruct its host server 40 to store, or to evict, the redundant copy 24, perhaps based on R. C, and the network locations 64.

Figure 4:
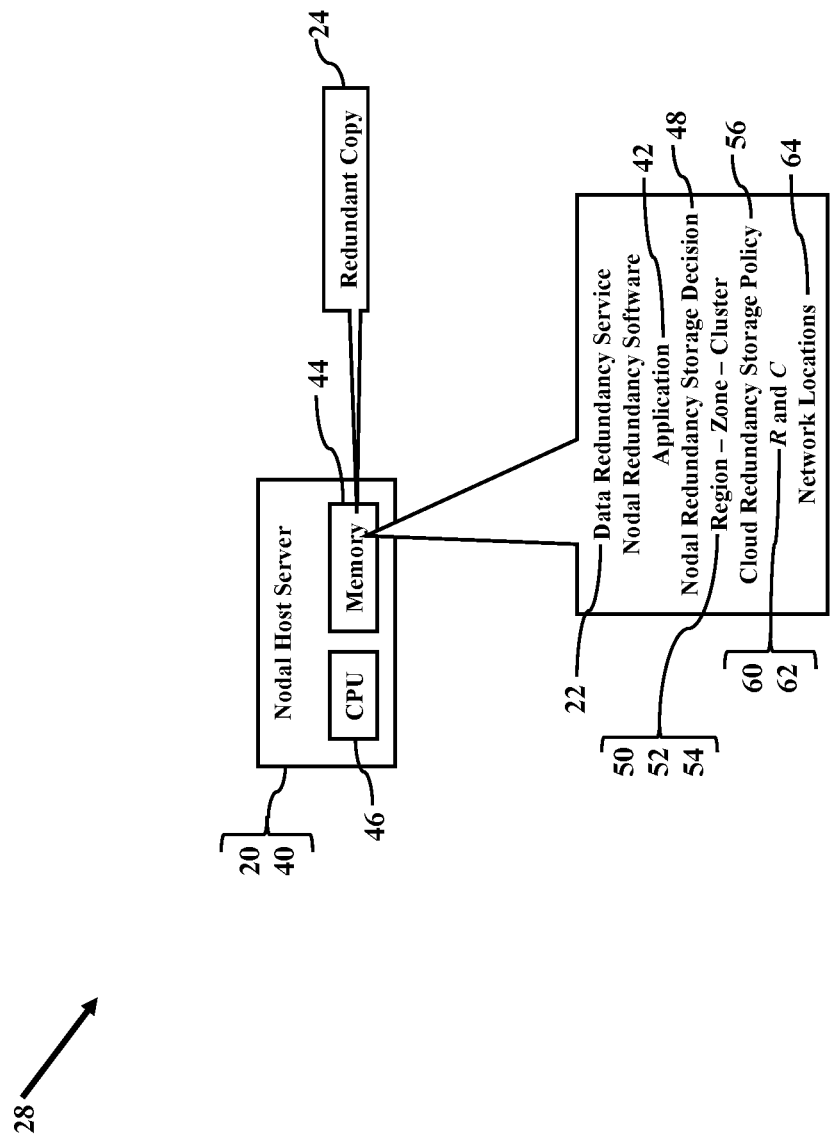
FIG. 4 illustrates examples of service eligibility.

FIG. 4 illustrates examples of service eligibility. As the computer system 20 (again illustrated as the host server 40) executes the nodal redundancy software application 42, the nodal redundancy software application 42 may cause the server 40 to evaluate its eligibility to provide or participate in the data redundancy service 22. The nodal redundancy software application 42 analyzes the rules, goals, and/or parameters specified by the cloud redundancy storage policy 56. The nodal redundancy software application 42 may then determine whether its host server 40 is qualified to locally store the redundant copy 24. If the server 40 is ineligible (as defined or specified by the cloud redundancy storage policy 56 and/or by the network locations 64), then the nodal redundancy software application may decline to provide, or participate in, the data redundancy service 22. As a simple example, suppose the host server 40 already locally stores one of the existing redundant copies C (illustrated as reference numeral 62). That is, in this example, the server 40 already locally stores the redundant copy 24 in its local memory device 44. Because the host server 40 locally stores one of the current redundant copies C, then the cloud redundancy storage policy 56 may disqualify the host server 40 from storing yet another duplicate copy. After all, the cloud redundancy storage policy 56 may specify that no single hardware device (such as the memory device 44) may store two (2) or more redundant copies C. A single hardware failure, in other words, may jeopardize the cloud redundancy storage policy 56. Indeed, the cloud redundancy storage policy 56 may impose further duplication rules/restrictions according to the region 50, zone 52, and/or cluster 54. No single cluster 54, for example, may store two (2) or more redundant copies C. The cloud redundancy storage policy 56 may even further require that no single zone 52 or region 50 store two (2) or more redundant copies C. So, the nodal redundancy software application 42 may first determine whether its local host (e.g., the server 40 and/or the local memory device 44) qualifies as a redundant storage destination. The cloud redundancy storage policy 56 may further specify other requirements, such as local memory space availability and region/zone/cluster memory usage/availability. The nodal redundancy software application 42 may thus determine its service eligibility to provide or participate in the data redundancy service 22 by comparing the stored content or inventory of its local memory device 44 to the cloud redundancy storage policy 56 and/or to the network locations 64. The nodal redundancy software application 42 may further determine its service eligibility by comparing its local memory space availability and/or its region/zone/cluster memory usage/availability to the cloud redundancy storage policy 56. If the local host server 40 satisfies the cloud redundancy storage policy 56, then the local host server 40 qualifies as a redundant storage destination and the nodal redundancy software application 42 may proceed. If the local host server 40, however, cannot meet or satisfy the cloud redundancy storage policy 56, then the host server 40 may be ineligible to participate and the nodal redundancy software application 42 may disqualify its local host server 40 as the redundant storage destination.

Eligibility may be dynamic. The eligibility of the server 40 to provide or participate in the data redundancy service 22 may change with time and with content. That is, the cloud redundancy storage policy 56 may specify different governing rules, goals, and/or parameters according to the content (e.g., the electronic data 26 illustrated in FIGS. 1-2) being duplicated or backed up. Some customers, clients, or content may require quadruple or more duplicate copies. Other customers, clients, or content may suffice with a single copy. So, the cloud redundancy storage policy 56 may specify differing R and C requirements, depending on any factors (such as the data content and customer/client requirements). The differing R and C requirements may cause dynamic changes in eligibility. The cloud redundancy storage policy 56 may further specify differing regional 50, zonal 52, and/or cluster 54 requirements, again perhaps depending on the data content and customer/client requirements. The differing regional 50, zonal 52, and/or cluster 54 requirements may also cause dynamic changes in eligibility. Moreover, changing network locations 64 may also cause dynamic changes in eligibility. The nodal redundancy software application 42 may thus include program code that forces or causes a re-evaluation of eligibility according to periodic or random time or upon any change in content. R. C. region 50, zone 52, cluster 54, and/or network location 64. The nodal redundancy software application 42 may dynamically reassess its eligibility to ensure data integrity and availability for any content and for any client/customer.

FIGS. 5A-7 illustrate examples of conditional redundancy. The nodal redundancy software application 42 analyzes the cloud redundancy storage policy 56. The nodal redundancy software application 42 inspects the cloud redundancy storage policy 56 and identifies/reads the required number of redundant copies R (illustrated as reference numeral 60) that should be stored by the cloud computing network 28. The nodal redundancy software application 42 inspects the cloud redundancy storage policy 56 and also identifies/reads the current number of redundant copies C (illustrated as reference numeral 62) that are currently stored by the cloud computing network 28. If specified, the nodal redundancy software application 42 also identifies/reads any other data redundancy parameters (such as how many of the redundant copies R must be stored according to the region 50, zone 52, and/or cluster 54 and any local and/or region/zone/cluster memory usage/availability requirements). The cloud redundancy storage policy 56 may also identify how many redundant copies C (illustrated as reference numeral 62) are currently stored according to the region 50, zone 52, and/or cluster 54 (for example, according to the network locations 64). The nodal redundancy software application 42 may then instruct the hardware processor 46 to compare R to C. As FIG. 5A illustrates, when the hardware processor 46 determines that C<R, the nodal redundancy software application 42 determines an under-replicated condition 70, on behalf of the cloud computing network 28. That is, the nodal redundancy software application 42 self-determines that the cloud computing network 28 should increase the current count C to achieve R. Moreover, by also analyzing the cloud redundancy storage policy 56 and/or the network locations 64, the nodal redundancy software application 42 may autonomously and independently determine that its own host server 40 should increase C by locally storing the additional redundant copy 24 (perhaps based on the cloud redundancy storage policy 56 specifying copy requirements or copy counts by the region 50, zone 52, and/or cluster 54). The nodal redundancy software application 42, in other words, self-determines that its host server 40 qualifies as a redundant storage destination and should locally store the additional redundant copy 24. The nodal redundancy software application 42 generates the affirmative or positive nodal redundancy storage decision 48 to locally store the additional redundant copy 24 independent of voting consensus or cooperation from the other cloud computing nodes 30 of the cloud computing network 28 (illustrated in FIGS. 1-3).

As FIG. 5A illustrates, the cloud computing node 30 may inform the cloud computing network 28. When the nodal redundancy software application 42 generates the nodal redundancy storage decision 48 to locally store the additional redundant copy 24, the nodal redundancy software application 42 may report that nodal redundancy storage decision 48 to the cloud computing network 28. The nodal redundancy software application 42, for example, may instruct the hardware processor 46 to send the nodal redundancy storage decision 48 to a designated network address associated with the cloud computing network 28. While the nodal redundancy storage decision 48 may be sent to any destination, FIG. 5A illustrates cloud collection and distribution. The cloud computing network 28, in other words, may task or assign a queuing system for collecting and streaming the nodal redundancy storage decisions 48 sent by the cloud computing nodes 30 participating in the data redundancy service 22. The queuing system, for example, may be a cloud server 72 that collects the nodal redundancy storage decisions 48. When the cloud server 72 receives any nodal redundancy storage decision 48, then cloud server 72 may store and queue the nodal redundancy storage decisions 48 for distribution to the other cloud computing nodes 30 participating in the data redundancy service 22. The nodal redundancy storage decision 48 describes, explains, or indicates the cloud computing node's intention to store the additional redundant copy 24 to the local memory device 44. The nodal redundancy storage decision 48, for example, may document how and why the host server 40 satisfied the cloud redundancy storage policy 56 and was thus eligible to locally store the additional redundant copy 24. The nodal redundancy storage decision 48 may also specify the network location 64 (such as IP address) assigned to, or associated with, the local memory device 44 and/or the host server 40. The nodal redundancy storage decision 48 may also specify the filename or other identifier associated with the redundant copy 24. The nodal redundancy storage decision 48 may further specify the region 50, zone 52, and/or cluster 54 assigned to the local memory device 44 and/or the host server 40. When the cloud computing network 28 receives the nodal redundancy storage decision 48, the cloud computing network 28 forwards or routes the nodal redundancy storage decision 48 to the cloud server 72.

The cloud server 72 may then distribute the nodal redundancy storage decision 48. When the cloud server 72 receives the nodal redundancy storage decision 48, the cloud server 72 stores and queues the nodal redundancy storage decision 48 (perhaps in a database) for distribution to the other cloud computing nodes 30 participating in the data redundancy service 22. The cloud computing network 28 thus collects the individual nodal redundancy storage decisions 48 and disperses the individual nodal redundancy storage decisions 48 to the other cloud computing nodes 30. Because each cloud computing node 30 may receive each individual nodal redundancy storage decision 48, each cloud computing node 30 may thus locally store and maintain a current, accurate, or up-to-date data redundancy inventory 66 of the redundant copies 24 stored by the nodes 30. The data redundancy inventory 66 may thus log or record each nodal redundancy storage decision 48 reported by each cloud computing node 30. The data redundancy inventory 66 may thus itself be an electronic database having entries that map, relate, or associate each redundant copy 24 to its corresponding network location 64 of nodal storage. Because each cloud computing node 30 may separately maintain its own inventory records, each cloud computing node 30 may easily count, tally, and/or determine the currently-stored C redundant copies (illustrated as reference numeral 62). So, each nodal redundancy storage decision 48 may include or represent a write request to update the decentralized, but shared, data redundancy inventory 66 stored by each cloud computing node 30. Each cloud computing node 30 may inspect or check each nodal redundancy storage decision 48 for an update conflict. As long as two different nodes 30 are not attempting to write conflicting records (as later paragraphs explain), the cloud computing node 30 writes/stores the nodal redundancy storage decision 48 to its data redundancy inventory 66. The data redundancy inventory 66 thus represents a shared database that is individually maintained and individually updated.

The cloud computing node 30 may thus subscribe to inventory updates. Each cloud computing node 30 shares its nodal redundancy storage decision 48, thus signaling its intention to locally store the additional redundant copy 24. The cloud computing node 30, in other words, may sent a write request to update the shared database representing the data redundancy inventory 66. Every cloud computing node 30 stores a copy of the data redundancy inventory 66 in its memory device 44. Every cloud computing node 30 subscribes to a stream of inventory changes, and every cloud computing node 30 independently applies the inventory changes. The cloud server 72, as an example, may represent an APACHE KAFKA® messaging queue that distributes the nodal redundancy storage decisions 48 to the subscribing cloud computing nodes 30. The APACHE KAFKA® messaging queue, for example, guarantees that the nodal redundancy storage decisions 48 are delivered in the same order on every node 30. All cloud computing nodes 30 thus receive all inventory changes (in the same order), and all conditions in these inventory changes are based on the state of the data redundancy inventory 66 prior to the change (e.g., a condition might say "If the list in the inventory has this state", but it may not say "If the current time is 7:15 PM"), all nodes 30 end up with the same data redundancy inventory 66 in its memory device 44. So in a sense, every node 30 is a collection destination for the data redundancy inventory 66, and the approval/rejection of inventory changes independently happens on every node 30, but with the same result on every node 30.

The cloud computing nodes 30 may thus share their nodal redundancy storage decisions 48. Because each cloud computing node 30 separately stores its own copy of the data redundancy inventory 66 (such as the network locations 64 and metadata), each data redundancy inventory 66 describes the network locations 64 that currently store the C redundant copies 24. Each data redundancy inventory 66 may also describe the network locations 64 that intend to, or are requesting to, store additional C redundant copies 24. Because each data redundancy inventory 66 reflects historical and currently-pending nodal redundancy storage decisions 48, the cloud computing nodes 30 share and coordinate their respective nodal redundancy storage decisions 48.

Figure 5B:
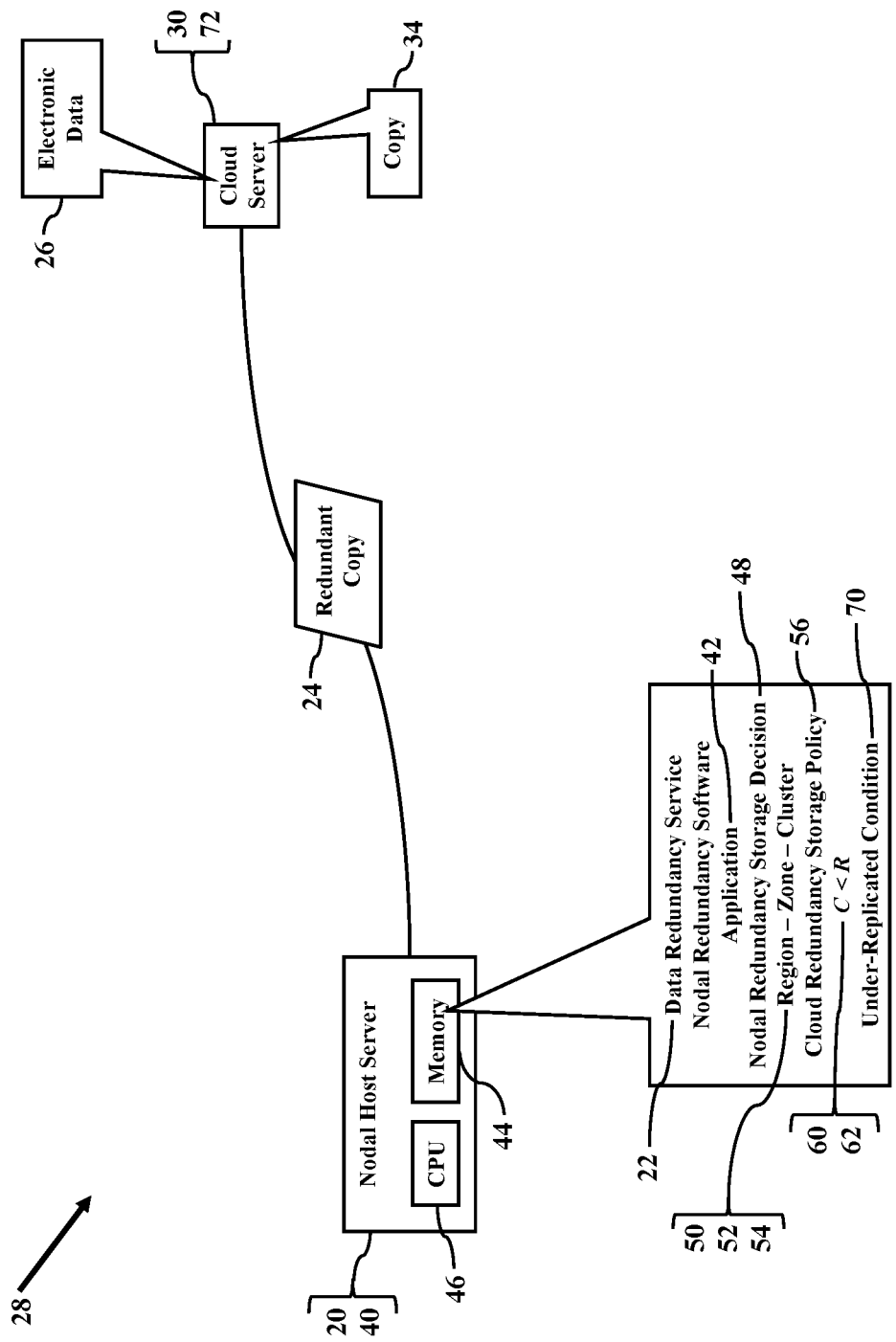

As FIG. 5B illustrates, the additional redundant copy 24 is obtained. When the nodal redundancy storage decision 48 is affirmed, the nodal redundancy software application 42 determines that its host server 40 deserves to locally store the additional redundant copy 24. The nodal redundancy software application 42 may then instruct or cause its host server 40 to acquire the additional redundant copy 24. While the additional redundant copy 24 may be obtained from any source, FIG. 5B illustrates cloud sourcing and delivery. That is, the additional redundant copy 24 may be generated by any of the cloud computing nodes 30 affiliated with the cloud computing network 28. As a simple example, suppose the cloud server 72 is tasked with providing the additional redundant copy 24. The cloud computing environment 28, in other words, may designate the cloud server 72 as a source for each additional redundant copy 24 of any electronic data 26 (illustrated in FIG. 1). So, when the nodal redundancy software application 42 determines that its host server 40 should locally store the additional redundant copy 24, the nodal redundancy software application 42 may be configured to query the cloud server 72. The nodal redundancy software application 42 may instruct the hardware processor 46 to generate and send a data replication request into the cloud computing network 28. The replication request may specify the under-replicated condition 70 and identify the electronic data 26 to be duplicated (such as a filename or identifier of shard/segment/element/structure/content). The replication request routes via the cloud computing network 28 to a network address (e.g., IP address) associated with the cloud server 72. The cloud server 72 stores either the original version of the data 26 and/or the currently-existing copy 24 of the data 26. The cloud server 72 generates and/or retrieves the additional redundant copy 24 and sends the additional redundant copy 24 as a query response. The cloud computing network 28 routes the additional redundant copy 24 to the network address (IP address) associated with the host server 40. When the host server 40 receives the additional redundant copy 24, the nodal redundancy software application 42 instructs the hardware processor 46 to locally store the additional redundant copy 24 to the local memory device 44.

FIG. 6 illustrates more examples of the under-replicated condition 70. Because the host server 40 independently and individually decides to locally store the additional redundant copy 24, the host server 40 may inform the cloud computing network 28 of its intention to store the redundant copy 24. That is, the cloud computing node 30 may send its nodal redundancy storage decision 48 that is based on the data redundancy inventory 66. Because the cloud computing network 28 shares the data redundancy inventory 66, the data redundancy inventory 66 describes a list of the cloud computing nodes 30 (and their corresponding network locations 48) that currently store the C redundant copies 24. However, the data redundancy inventory 66 may also describe another list of the pending or tentative database write requests (e.g., the nodal redundancy storage decision 48) that have been submitted to the electronic database 68. When any cloud computing node 30 receives the shared electronic database 68, each cloud computing node 30 may inspect the two lists when generating its corresponding nodal redundancy storage decision 48. The nodal redundancy storage decision 48 thus reflects the freshest, latest data redundancy inventory 66 to individually optimize C to R. The nodal redundancy storage decision 48 describes, explains, or indicates how and why the additional redundant copy 24 was stored to the local memory device 44. The nodal redundancy storage decision 48, for example, may document how and why the host server 40 satisfied the cloud redundancy storage policy 56 and was thus eligible to locally store the additional redundant copy 24. The nodal redundancy storage decision 48 may also specify the network location 64 (such as IP address) assigned to, or associated with, the local memory device 44 and/or the host server 40. The nodal redundancy storage decision 48 may also specify the filename or other identifier associated with the redundant copy 24. The nodal redundancy storage decision 48 may further specify the region 50, zone 52, and/or cluster 54 assigned to the local memory device 44 and/or the host server 40. When the cloud computing network 28 receives the nodal redundancy storage decision 48, the cloud computing network 28 forwards or routes the nodal redundancy storage decision 48 to the cloud server 72. When the cloud server 72 receives the nodal redundancy storage decision 48, the cloud server 72 updates the data redundancy inventory 66 records to indicate that the host server 40 now stores the additional redundant copy 24.

As FIGS. 5A-5B and 6 illustrate, the nodal redundancy storage decisions 48 may broadcast intentions. The nodal redundancy storage decision 48 describes, explains, or indicates the cloud computing node's intention to store the additional redundant copy 24 to its local memory device 44. When the cloud server 72 receives the nodal redundancy storage decision 48, the cloud server 72 updates the data redundancy inventory 66. The cloud server 72, for example, may log or track the cloud computing node 30, it's network location 64, and its intention to store the additional redundant copy 24. The data redundancy inventory 66, in other words, may store actual storage locations and intended/tentative future storage locations. The cloud computing network 28 may thus store information about where the redundant copies 24 are actually stored by which cloud computing nodes 30. For example, for some filename X, the cloud computing network 28 may store the following information: nodes 1, 2 and 3 have communicated that they intend to store a copy of X; and nodes 2, 3 and 4 currently store a copy of X. By sharing the inventory records (such as both actual and tentative storage locations) maintained by the electronic database 68, all the cloud computing nodes 30 may retrieve and inspect the data redundancy inventory 66. Each individual cloud computing node 30 may thus use the inventory records 66 to re-affirm whether an additional C redundant copy is needed. If the cloud computing node 30 determines that an additional C redundant copy is needed, the cloud computing node 30 may add itself to the data redundancy inventory 66 list of nodes that intend to store X. When the cloud computing node 30 receives the inventory records 66, the cloud computing node 30 may then reassess and confirm the nodal redundancy storage decision 48 in light of the inventory records 66.

Figure 7:
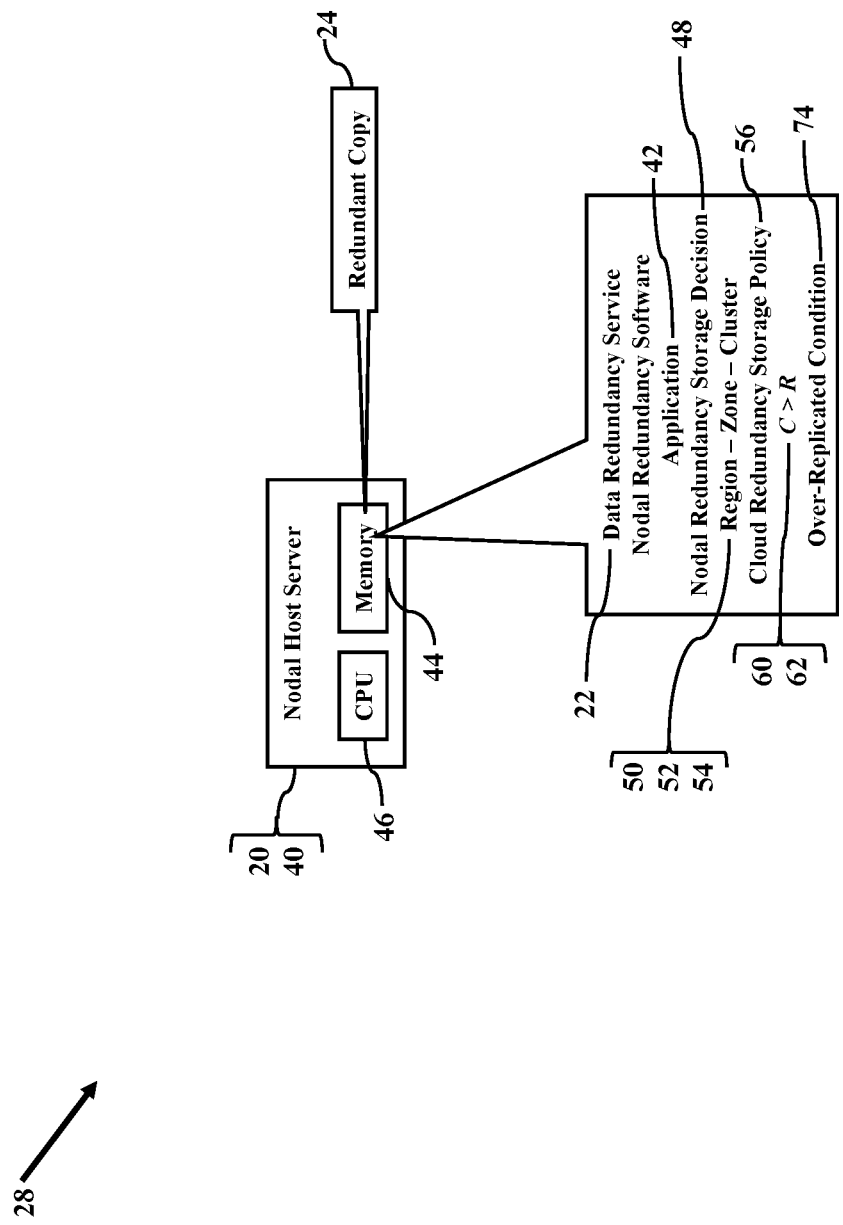

FIG. 7, though, illustrates examples of an over-replicated condition 74. The nodal redundancy software application 42 reads the cloud redundancy storage policy 56 and compares the required number of redundant copies R (illustrated as reference numeral 60) that should be stored by the cloud computing network 28 versus how many redundant copies C (illustrated as reference numeral 62) currently exist. When C>R, the nodal redundancy software application 42 determines the over-replicated condition 74, on behalf of the cloud computing network 28. That is, the nodal redundancy software application 42 self-determines that the cloud computing network 28 currently stores an excess count/amount of the redundant copies C. When the current count C of the duplicate copies exceeds the required count R, the nodal redundancy software application 42 determines that the over-replicated condition 74 exists. The nodal redundancy software application 42, for example, may do nothing and allow the over-replicated condition 74 to persist. However, the nodal redundancy software application 42 may proactively investigate evicting/deleting at least one of the redundant copies C that is currently stored by the cloud computing network 28. The redundant copies C are over-populated and any memory space associated with the corresponding region 50, zone 52, cluster 54, and/or local storage 44 may be freed up and reallocated.

First, though, the nodal redundancy software application 42 may determine eligibility. The nodal redundancy software application 42 may determine whether its local host server 40 (e.g., the local memory device 44) locally stores one of the existing redundant copies C (such as the redundant copy 24). The nodal redundancy software application 42 may merely cooperate with its operating system to search the local memory device 44 for a filename or other identifier associated with the redundant copy 24. The nodal redundancy software application 42 may additionally or alternatively inspect the cloud redundancy storage policy 56 for its own network location 64 (e.g., IP address) as one of the currently stored redundant copies C (as explained with reference to FIG. 4). However the local storage is determined, the local storage may be a first criterion, gate, or check for providing or for participate in the data redundancy service 22. After all, if the local host server 40 does not locally store the redundant copy 24, then the host server 40 may be disqualified from transferring/evicting the redundant copy 24. There is nothing to evict, in other words, so the host server 40 cannot satisfy the cloud redundancy storage policy 56 and the nodal redundancy software application 42 may remove or disqualify itself.

The host server 40 may always be eligible during regional/zonal/clusteral removal. There are times when the host server 40 is being removed from the cluster 54, perhaps due to maintenance, replacement, or operational issue. Whatever the reason(s), the memory contents of the host server 40 may need to be transferred or moved to another nodal member of the region 50, zone 52, and/or cluster 54. In these cases, then, the nodal redundancy software application 42 may autonomously and independently move at least some of the memory contents of the host server 40 to a different networked storage destination. The memory contents, for example, may be entirely transferred to a single networked storage location. More likely, though, the memory contents of the host server 40 may be split across many other hosts. For instance, if host server 40 has five (5) files, the nodal redundancy software application 42 may pick different networked storage destinations for each file. The nodal redundancy software application 42 may autonomously and independently select the networked storage destination(s) based on the cloud redundancy storage policy 56, any copy requirements or copy counts by the region 50, zone 52, and/or cluster 54, and any other data redundancy parameters (such as local and/or region/zone/cluster memory usage/availability requirements). When the host server 40 is being evicted, for whatever reason, the host server 40 may be automatically eligible for data transfer.

The host server 40 may also be eligible for read/write operations. When the host server 40 does locally store redundant copy 24, the nodal redundancy software application 42 may autonomously and independently evaluate its own host server 40 as an eviction candidate. Here, though, eviction may include deleting, or overwriting, the redundant copy 24 to reduce the current count C of the redundant copies. The nodal redundancy software application 42 may read the cloud redundancy storage policy 56 and identify any copy requirements or copy counts by the region 50, zone 52, and/or cluster 54. If specified, the nodal redundancy software application 42 also identifies/reads any other data redundancy parameters (such as local and/or region/zone/cluster memory usage/availability requirements). The nodal redundancy software application 42 again independently generates the nodal redundancy storage decision 48. Here, though, when the host server 40 satisfies the cloud redundancy storage policy 56 specifying or defining the over-replicated condition 74, the nodal redundancy storage decision 48 indicates that the locally-stored redundant copy 24 should be deleted. The nodal redundancy software application 42 may then instruct or cause the hardware processor 46 to delete or overwrite its locally-stored redundant copy 24 from the memory device 44. The nodal redundancy software application 42 may also instruct the hardware processor 46 to update the cloud redundancy storage policy 56 to reflect the removal/eviction/deletion of the additional redundant copy 24 from the local memory device 44.

Figure 8:
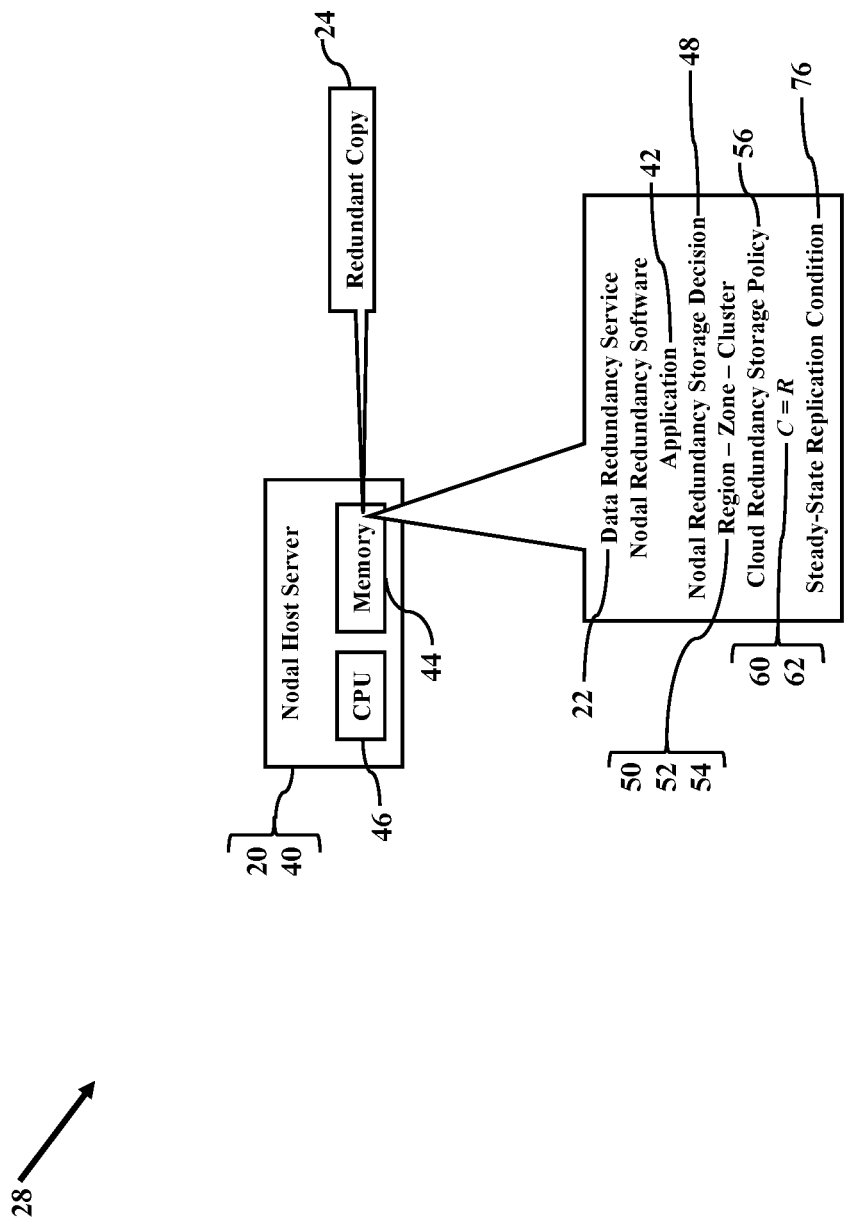

FIG. 8 illustrates examples of a "do nothing" nodal redundancy storage decision 48. When C=R, the nodal redundancy software application 42 determines that the current count C of the duplicate copies is equal to the required number R. Because C=R, the cloud computing network 28 currently stores the required number R. The nodal redundancy software application 42 may determine a steady-state replication condition 76 and may decline to act or to dynamically participate in the data redundancy service 22. The nodal redundancy software application 42 may, for example, be configured to wait a preset time before reacquiring the cloud redundancy storage policy 56 (e.g., C and R) and/or redetermining how many redundant copies C (illustrated as reference numeral 62) currently exist within the cloud computing network 28.

The nodal redundancy software application 42 thus has freedom to act on behalf of the cloud computing network 28. The nodal redundancy software application 42 may solely decide to store, to not store, or to evict the redundant copy 24. The nodal redundancy software application 42, in other words, may exclusively and independently generate the nodal redundancy storage decision 48 based on the cloud redundancy storage policy 56 (e.g., R) and the data redundancy inventory 66 (e.g., C). The nodal redundancy software application 42 merely informs the cloud computing network 28 of its intent to store or evict. The cloud computing network 28 then either logs and approves the nodal redundancy storage decision 48 (such as by updating the shared electronic database 68 storing the data redundancy inventory 66) or the cloud computing network 28 denies the nodal redundancy storage decision 48 (perhaps as a result of conflict resolution). The nodal redundancy software application 42 thus generates the nodal redundancy storage decision 48 without decisional collaboration or consensus from the other cloud computing nodes 30 associated with the cloud computing network 28. The nodal redundancy software application 42 merely relies on the accuracy of the data redundancy inventory 66, as coordinated with or reported by each cloud computing node 30. The nodal redundancy software application 42 thus decides, on its own, whether or not the cloud computing network 28 (e.g., the region 50, the zone 52, and/or the cluster 54) requires the redundant copy 24 and whether or not the host server 40 should locally store the additional redundant copy 24.

Networking and computer functioning are improved. Conventional replication schemes utilize a tabular layout that maps copies to servers. Computer networks (such as cloud services and cloud storage), though, have hundreds or thousands of client- and server-facing nodes. Conventional replication schemes thus require an exceptionally large tabular layout that consumes large amounts of byte memory and that is slow to process. Moreover, conventional replication schemes utilize consensus algorithms that require communication and coordination between the hundreds or thousands of client- and server-facing nodes. The conventional replication schemes thus add significant packet traffic, which congests and bogs down networks. The conventional replication schemes also require significant nodal hardware and software resources to negotiate mirrored copies of data. The nodal redundancy software application 42, in contradistinction, does not require a large tabular layout nor consensus negotiations. The nodal redundancy software application 42, instead, is a purely local, decentralized nodal solution that is independently and exclusively executed by the computer system 20 (such as the nodal server 40). The nodal redundancy software application 42 may merely access and/or store the data redundancy inventory 66 (such as the two lists specifying the nodes 30 intending or requesting to store the redundant copy 24 and the current nodes 30 already or currently storing the C redundant copies 24). The nodal redundancy software application 42 merely executes simple logical rules and service parameters specified by the cloud redundancy storage policy 56 to generate the nodal redundancy storage decision 48. The nodal redundancy software application 42 need only initiate small-bandwidth request/response transactions to retrieve or to update the cloud redundancy storage policy 56 and/or the data redundancy inventory 66. Once the server 40 receives the cloud redundancy storage policy 56, the nodal redundancy software application 42 then solely generates the nodal redundancy storage decision 48 without further involvement from the other cloud computing nodes 30. The nodal redundancy software application 42 merely relies on the accuracy of the data redundancy inventory 66, as coordinated with or reported by each cloud computing node 30. The nodal redundancy software application 42 thus greatly reduces network traffic and greatly increases hardware/software processing capabilities.

Consensus is eliminated. Again, because modern cloud computing networks have hundreds or even thousands of distributed nodes, datacenters and cloud computing networks are always encountering the distributed consensus problem of failed/faulty nodes and abnormal behavior. Elaborate consensus mechanisms are thus conventionally used to achieve a plan of agreement, despite the presence of failed/faulty nodes and abnormal behavior. These conventional consensus mechanisms, though, are complicated to execute and consume much hardware and software resources. Moreover, the conventional consensus mechanisms utilize broadcast mechanisms to elect leadership and to convey state updates, and these broadcast mechanisms flood cloud networks with much packet traffic. The nodal redundancy software application 42, though, removes any need for consensus mechanisms. The nodal redundancy software application 42 decides, by itself, to provide or participate in the data redundancy service 22, merely based on its individual compliance with the governing cloud redundancy storage policy 56 and the freshest data redundancy inventory 66. No complicated consensus mechanism burdens the server 40, and no packet flooding of messages is needed. The cloud computing network 28 merely relies on each cloud computing node 30 to report their nodal redundancy storage decisions 48 to ensure the accuracy of the data redundancy inventory 66. The nodal redundancy software application 42 is an elegant, simple, nimble, and lightweight solution for ensuring data integrity and availability.

Networking and computer functioning are further improved. Conventional replication schemes utilize a distribution layout that maps replicated copies to hosts. Again, because modern cloud computing networks have hundreds or thousands of nodes, the conventional replication schemes require a complicated distribution plan that requires much hardware/software resources to generate. The nodal redundancy software application 42, however, is a purely local solution without consensus from the cloud computing network 28. The server 40 generates its own nodal redundancy storage decision 48 to locally store or evict the redundant copy 24, perhaps merely based on the data redundancy inventory 66. No complicated distribution layout need be generated, managed/updated, and dispersed to nodal members. The nodal redundancy software application 42 does not unnecessarily move/transfer/copy data, which again greatly reduces network traffic and greatly increases hardware/software processing capabilities.

Figure 9:
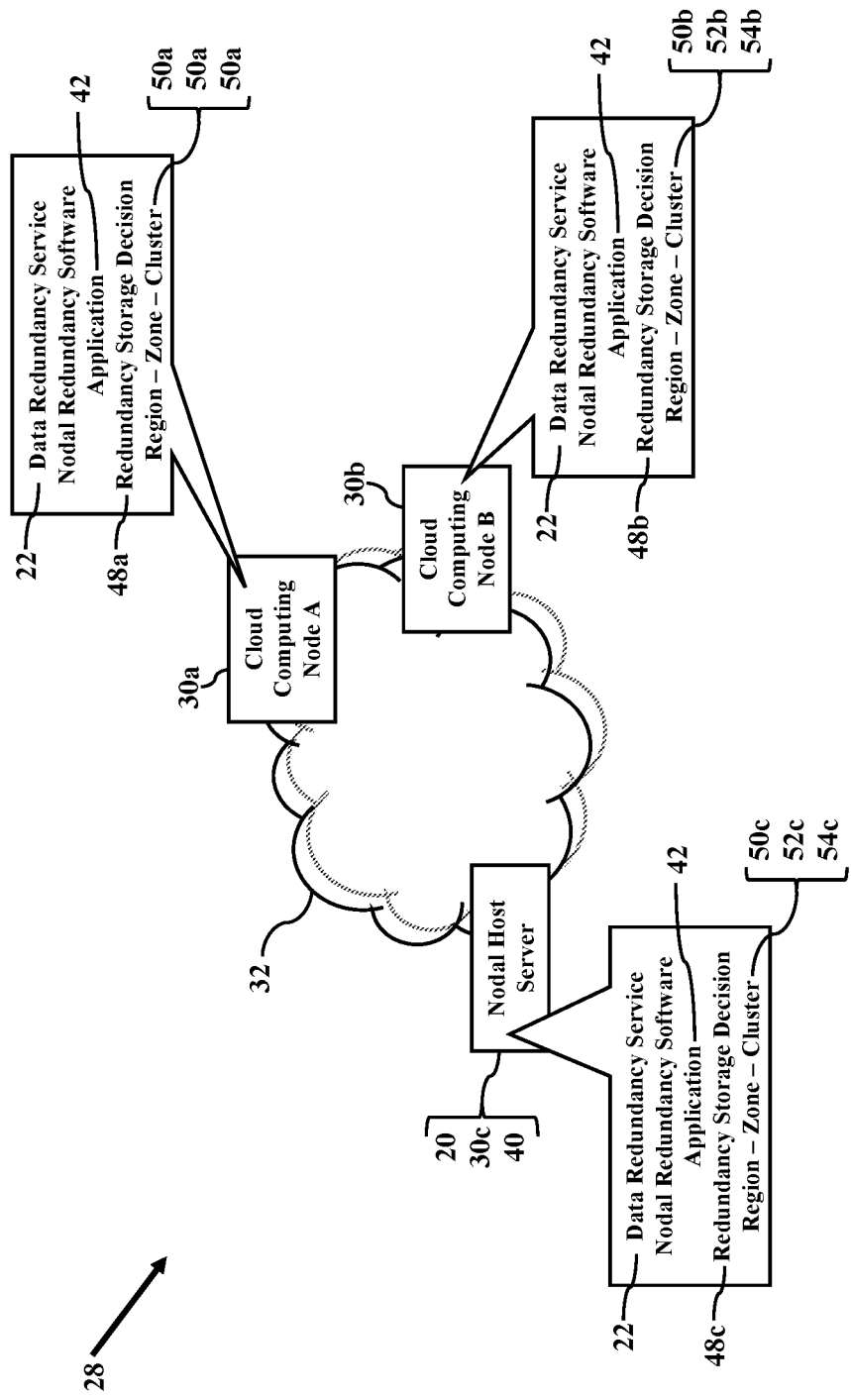
FIGS. 9-10 illustrate examples of cloud deployment.
Figure 10:
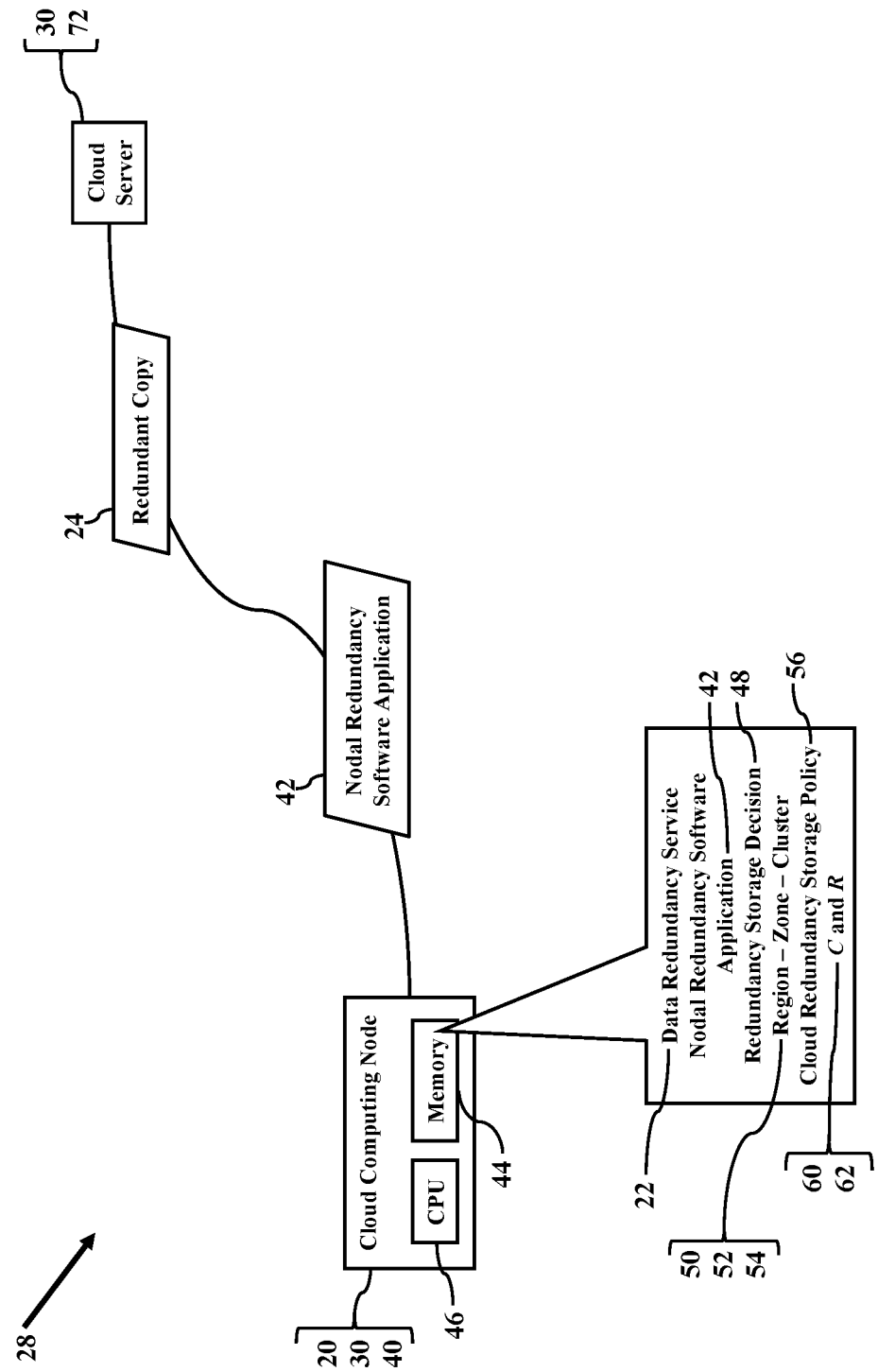

FIGS. 9-10 illustrate examples of cloud deployment. Because the nodal redundancy software application 42 is a simple and nimble cloud data redundancy solution, FIG. 9 illustrates examples of cloud distribution. The cloud computing network 28 may distribute, push, or download the nodal redundancy software application 42 to the other servers, devices, computers, or other cloud computing nodes 30 operating within, or affiliated with, the cloud computing network 28. Any cloud computing node 30, in other words, may register for the cloud-based data redundancy service 22 and download/host the nodal redundancy software application 42. The cloud computing nodal host 30 may then receive a service authorization to independently and individually decide whether or not the cloud computing nodal host dynamically participates in the data redundancy service 22. The cloud computing nodal host 30 may also retrieve the cloud redundancy storage policy 56 and also locally generate its own corresponding nodal redundancy storage decision 48. While any architecture or mechanism may be used, FIG. 10 again illustrates cloud sourcing and delivery. That is, the cloud computing network 28 may provide the nodal redundancy software application 42 to its cloud computing nodes 30. As a simple example, again suppose the cloud server 72 stores and downloads the nodal redundancy software application 42 to the cloud computing nodes 30. Any cloud computing node 30 that participates in the data redundancy service 22 may register with the cloud computing network 28 and have permission to download the nodal redundancy software application 42. Each participating cloud computing node 30 may then autonomously generate its corresponding nodal redundancy storage decision 48.

The data redundancy service 22 thus automatically distributes one or more of the redundant copies 24. Whatever electronic content (e.g., an entire file, a data segment, a shard, or any other bits/bytes) each redundant copy 24 represents, the data redundancy service 22 disperses the R redundant copies 60 throughout the cloud computing network 28 (perhaps according to the region 50, zone 52, and/or cluster 54 as specified by the cloud redundancy storage policy 56). Because the R redundant copies 60 are dispersed throughout the cloud computing network 28, the data redundancy service 22 minimizes the risk of data loss. The data redundancy service 22, however, also reduces unnecessary network traffic. Duplicate copies of any data are only added when necessary (e.g., when C<R causing the under-replicated condition 70 or when regional/zonal/clusteral redistribution is required). Conventional replication schemes usually over replicate, which creates excessive network traffic and incurs networking expenses.

Figure 11:
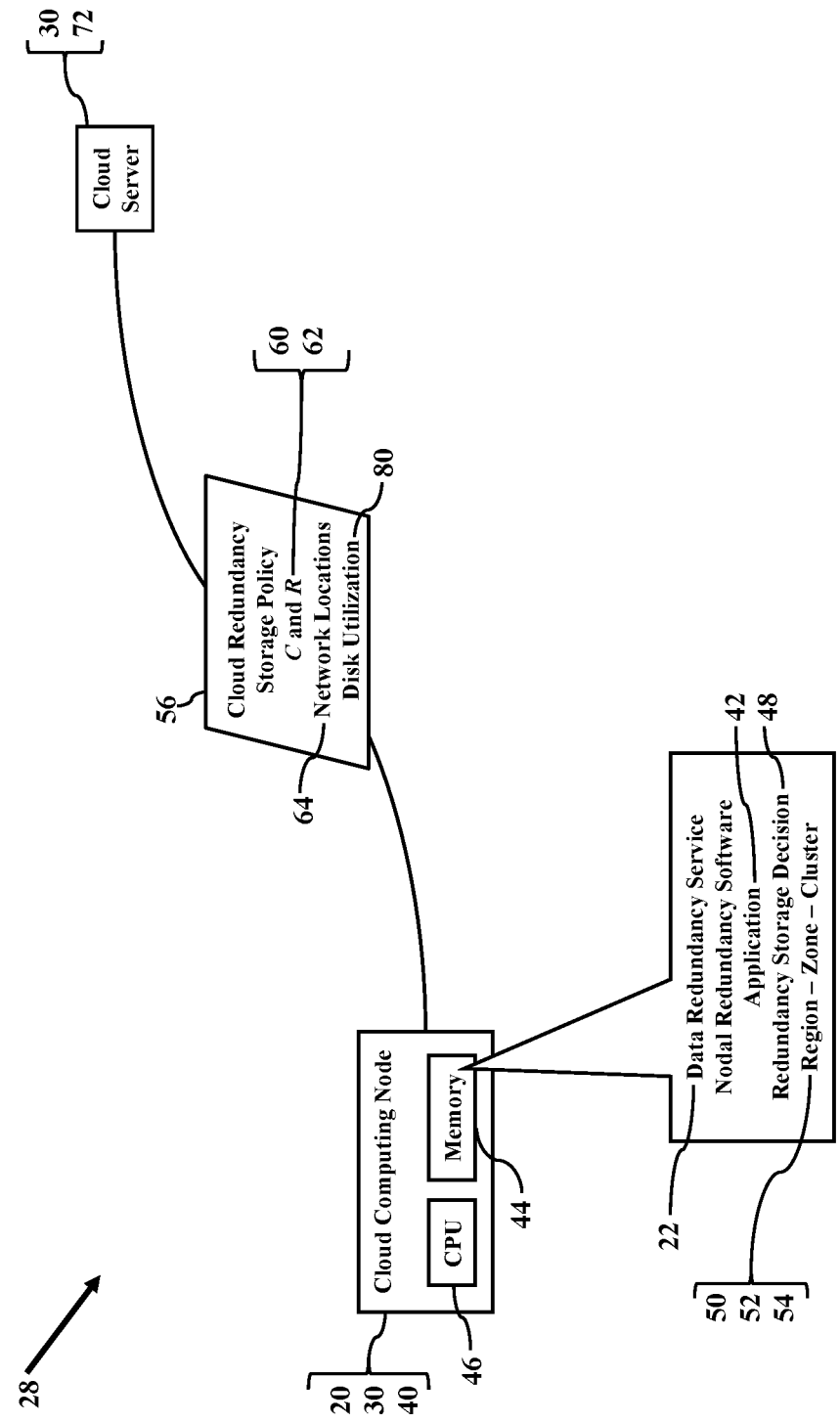
FIGS. 11-12 illustrate examples of the cloud redundancy storage policy.
Figure 12:
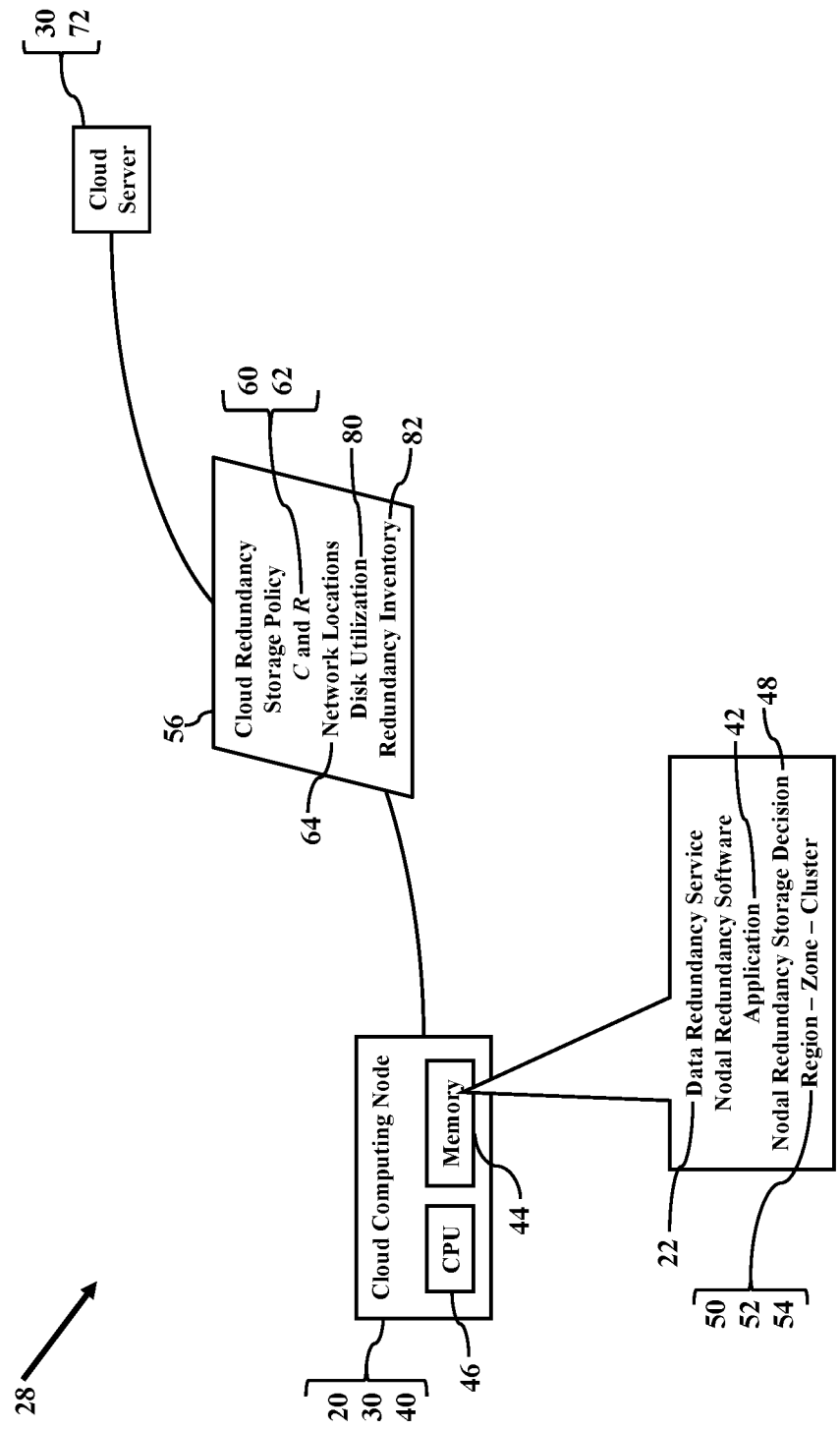

FIGS. 11-12 illustrate examples of the cloud redundancy storage policy 56. The cloud redundancy storage policy 56 specifies one or more governing rules, goals, and/or parameters associated with the data redundancy service 22. The cloud redundancy storage policy 56 is retrieved by any cloud computing node 30 participating in the data redundancy service 22. While the cloud redundancy storage policy 56 may be obtained from any source or location, FIG. 11 again illustrates centralized cloud sourcing and delivery. That is, for continued simplicity, suppose the cloud server 72 centrally stores and maintains the cloud redundancy storage policy 56 as a cloud resource to the cloud computing nodes 30 participating in the data redundancy service 22. As this disclosure previously explained, the cloud redundancy storage policy 56 identifies how many redundant copies R (illustrated as reference numeral 60) are required to be stored by the cloud computing network 28 (perhaps according to the region 50, zone 52, and/or cluster 54). The cloud redundancy storage policy 56 may also specify a current count of how many redundant copies C (illustrated as reference numeral 62) are stored by the cloud computing network 28 and perhaps their specific network locations 64 (e.g., the region 50, zone 52, cluster 54, and/or IP address) associated with each currently-existing redundant copy C. The cloud redundancy storage policy 56 may thus specify the current storage destinations associated with each currently-existing redundant copy C. The cloud redundancy storage policy 56, however, may also specify any disk utilization 80 associated with the region 50, the zone 52, the cluster 54, and/or the individual cloud computing node 30 (such as the host server 40). The disk utilization 80 may specify requirements, maximum values, minimum values, percentages, and any other measure of memory usage and/or capacity. The disk utilization 80, for example, may specify a total or maximum disk capacity byte limit and a current byte usage associated with any region 50, zone 52, cluster 54, and/or the individual cloud computing node 30 (such as the host server 40). The cloud redundancy storage policy 56, in other words, may specify a hierarchical redundant distribution requirement (e.g., by region/zone/cluster/computer) associated with the required count R and with the current count C. Each instance of the nodal redundancy software application 42 may instruct its corresponding hosting cloud computing node 30 (such as the host server 40) to query the cloud server 72 prior to generating its redundancy storage decision 48. The nodal redundancy software application 42 thus retrieves the freshest cloud redundancy storage policy 56 available that represents the current state of the data redundancy service 22.

FIG. 12 illustrates the data redundancy inventory 82. Because the cloud redundancy storage policy 56 may identify the network location 64 (e.g., the region 50, zone 52, cluster 54, and/or IP address) associated with each currently-existing redundant copy C (illustrated as reference numeral 62), the cloud redundancy storage policy 56 may also specify a complete data redundancy inventory 82 maintained by the cloud computing network 28. The cloud redundancy storage policy 56 may thus further specify the current count of the C duplicate copies stored by particular network locations 64. For example, the cloud redundancy storage policy 56 may specify the current count of the C duplicate copies, perhaps as specified by the data redundancy inventory 66. Again, the data redundancy inventory 66 may specify a list of nodes 30 that currently store the redundant copies 24, along with their corresponding network locations 64 (e.g., hierarchical region 50, zone 52, cluster 54, and IP address). The data redundancy inventory 66, however, may also specify another or additional list of nodes 30 intending or requesting to store the redundant copy 24, along with their corresponding network locations 64 (also perhaps according to hierarchical region 50, zone 52, cluster 54, and IP address). The cloud redundancy storage policy 56 may specify the required copy counts R by the region 50, the zone 52, the cluster 54, and/or the cloud computing node 30. The cloud redundancy storage policy 56, in other words, may provide individual target R and current counts C by the region 50, zone 52, cluster 54, and/or individual cloud computing node 30 (e.g. IP address). By inspecting and analyzing the cloud redundancy storage policy 56, the nodal redundancy software application 42 autonomously determines whether its host server 40 qualifies to participate in the data redundancy service 22 (such as storing or evicting the redundant copy 24, as previously explained).

The nodal redundancy software application 42 accesses the cloud redundancy storage policy 56 available from the cloud computing network 28. For simplicity, suppose again that the cloud server 72 stores and distributes the cloud redundancy storage policy 56 to the cloud computing nodes 30 (such as the host server 40) participating in the data redundancy service 22. The cloud server 72 downloads the latest/freshest cloud redundancy storage policy 56 to each participating cloud computing node 30. When the cloud computing node 30 (such as the host server 40) generates its corresponding nodal redundancy storage decision 48, the nodal redundancy software application 42 may then instruct the host server 40 to update the cloud computing network 28 to reflect the nodal redundancy storage decision 48 (such as file addition or eviction by IP address). The cloud server 72 may receive reports or updates from all the cloud computing nodes 30 participating in the data redundancy service 22. The cloud server 72 thus collects and maintains a centralized repository for the freshest, current status of all redundant copies C stored by the cloud computing network 28.

Figure 13:
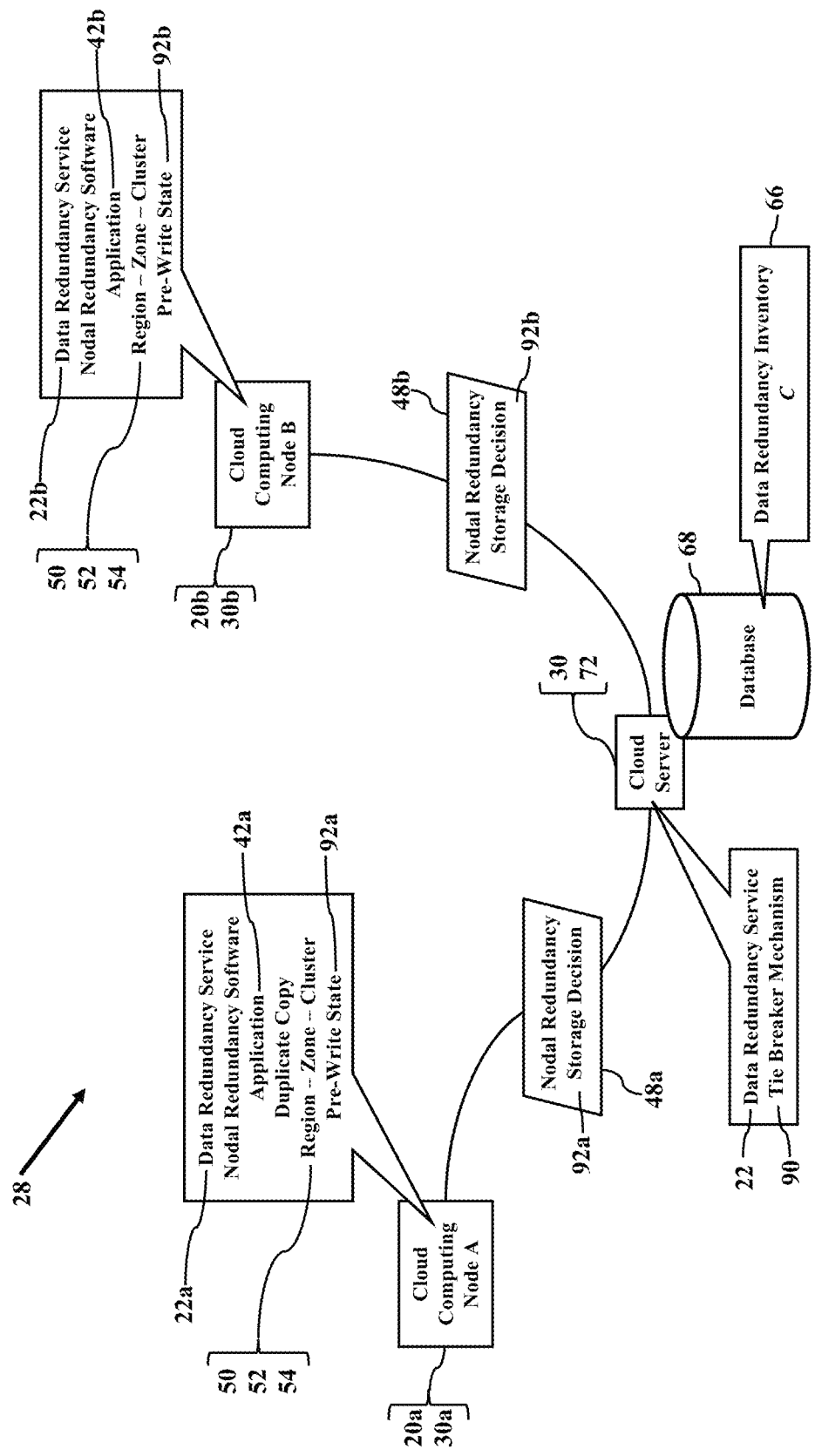
FIG. 13 illustrates examples of a tie breaker mechanism.

FIG. 13 illustrates examples of a tie breaker mechanism 90. Because many cloud computing nodes 30 may participate in the data redundancy service 22, there is a probable situation in which two (2) or more cloud computing nodes 30 generate conflicting nodal redundancy storage decisions 48. However, because the cloud computing network 28 shares/communicates the nodal redundancy storage decisions 48 among the cloud computing nodes 30, the cloud computing network 28 may implement an elegant tie breaker mechanism 90. When the nodal redundancy software application 42 generates its nodal redundancy storage decision 48, the nodal redundancy software application 42 may append, reference, or specify the data redundancy inventory 66 on which the nodal redundancy storage decision 48 is based. The cloud computing node 30, in other words, may save the pre-write state 92 of the data redundancy inventory 66. The pre-write state 92 may again describe the list of nodes 30 that currently store the redundant copies 24 (and their corresponding network locations 64) and the list of nodes 30 intending or requesting to store the redundant copy 24 (along with their corresponding network locations 64). Simply put, the pre-write state 92 provides the data behind, and/or an explanation of, why the nodal redundancy software application 42 generated its nodal redundancy storage decision 48. Because the cloud computing network 28 shares/communicates the nodal redundancy storage decisions 48 via the shared electronic database 68, the pre-write state 92 and its explanatory information is also conveyed to the cloud computing nodes 30. So, when the cloud computing network 28 (e.g., the cloud server 72 maintaining the electronic database 68) evaluates any write request (e.g., the nodal redundancy storage decision 48), the cloud computing network 28 may perform an inventory comparison. For example, the cloud server 72 compares the pre-write state 92 included with, or specified by, the nodal redundancy storage decision 48 to the current, latest, freshest, or global data redundancy inventory 66 stored by the electronic database 68. If the nodal redundancy storage decision 48 matches the global data redundancy inventory 66 stored by the electronic database 68, then the cloud server 72 may infer or determine that the nodal redundancy storage decision 48 is accurate. The cloud server 72 may approve the nodal redundancy storage decision 48 and write the nodal redundancy storage decision 48 to the electronic database 68. If, however, the nodal redundancy storage decision 48 fails to match the global data redundancy inventory 66 stored by the electronic database 68, then the cloud server 72 may infer or determine that the nodal redundancy storage decision 48 is not accurate. The cloud server 72 may deny/reject/ignore the nodal redundancy storage decision 48 and decline to update the electronic database 68. The cloud computing network 28 may thus recognize a "first write" wins strategy that rejects conflicting decisions that are based on old or stale inventory information. The old or stale inventory information merely means these storage decisions arrived on the queue in different order, but they may actually have happened at the same time in reality—the queue forces ordering.

Figure 14:
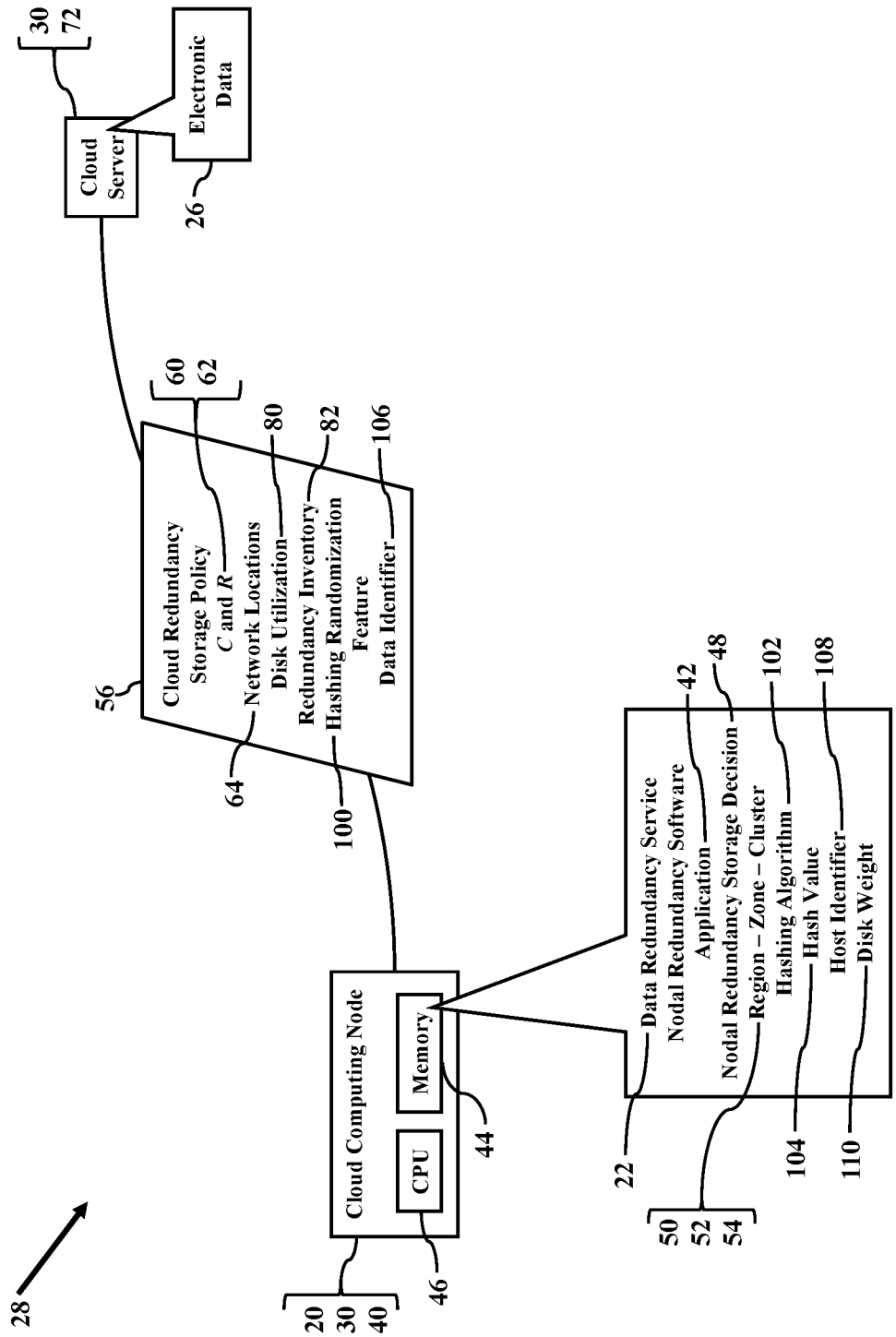
FIG. 14 illustrates examples of nodal randomization.

FIG. 14 illustrates examples of nodal randomization. Again, because there may be many cloud computing nodes 30 providing the data redundancy service 22, it is probable that a particular one of the cloud computing nodes 30 may generate a disproportionate amount or share of the nodal redundancy storage decisions 48. That is, the cloud computing node 30 may consistently or repeatedly favor itself as a redundancy storage destination. This scenario may often arise when the cloud computing node 30 has a high-capacity byte size memory device 44 with much available memory. The cloud computing node 30 may thus repeatedly decide that its high-capacity byte size memory device 44 should deserve to store many different redundant copies 24 of many different files, shards, segments, objects, or other electronic data 26, perhaps simply due to under-utilized or available byte capacity. The data redundancy service 22 and/or the cloud computing network 28, in other words, may over-concentrate the population or redundancy inventory 82 to the cloud computing node 30 having excess capacity.

Nodal randomization may be implemented. The data redundancy service 22 may specify a randomization technique or mechanism to ensure no single cloud computing node 30, or a group of cloud computing nodes 30, stores a disproportionate amount or share of the different redundant copies 24 of many different files, shards, segments, objects, or other electronic data 26. While any randomization technique or mechanism may be used, the cloud redundancy storage policy 56 may specify a hashing randomization feature 100. The hashing randomization feature 100 ensures that its corresponding host server 40 is not overly or repeatedly selected to locally store the redundant copy 24. As a simple example, the nodal redundancy software application 42 may consider the disk utilization 80 associated with the region 50, zone 52, cluster 54, and/or the host server 40. If the memory device 44 installed in the server 40 is under-utilized (e.g., ample free disk space in bytes), then the nodal redundancy software application 42 may repeatedly select its host server 40 to store more and more different duplicate copies 24. Similarly, if the cluster 54 has under-utilized memory space, then cloud computing nodes 30 associated with the cluster 54 (each running/executing an instance of the nodal redundancy software application 42) may repeatedly select the cluster 54 to store more and more duplicate copies 24. Multiple duplicate copies 24, in other words, could be concentrated to the server 40 or to the same group of cloud computing nodes 30, thus defeating or thwarting network distribution. The cloud computing network 28 may certainly prefer the best storage destinations (perhaps as measured by the disk utilization 80 or other performance criteria), but repeated storage decisions to the same server 40 or to the same group of cloud computing nodes 30 defeats network distribution.

The cloud computing network 28 may implement storage randomization. The cloud redundancy storage policy 56 introduces randomization into the nodal redundancy storage decision 48 by specifying an electronic hashing algorithm 102. When the nodal redundancy software application 42 receives the cloud redundancy storage policy 56, the nodal redundancy software application 42 reads and identifies the hashing algorithm 102 specified by the cloud redundancy storage policy 56. The nodal redundancy software application 42 may then retrieve, call, or implement an electronic version or software module representing the hashing algorithm 102. The hashing algorithm 102 allows the nodal redundancy software application 42 to generate a hash value 104 by hashing a data identifier 106 (associated with the electronic data 26) with a host identifier 108 associated with the cloud computing node 30 (such as the host server 40). The hash value 104 may then be weighted by a disk weight value 110 associated with the local disk (e.g., the memory device 44) installed in the host server 40. The hashing randomization feature 100 may be applied to each cloud computing node 30 participating in the data redundancy service 22. The cloud redundancy storage policy 56, for example, may specify or reference the hashing randomization feature 100 that has been pre-calculated (perhaps by the cloud server 12) for each cloud computing node 30 participating in the data redundancy service 22. The nodal redundancy software application 42 may, additionally or alternatively, self-calculate the hashing randomization feature 100 for each cloud computing node 30 participating in the data redundancy service 22 (perhaps based on data identifiers 106, specified by the cloud redundancy storage policy 56, that correspond to each cloud computing node 30). Furthermore, the multiple hashing randomization features 100 (calculated for each cloud computing node 30, perhaps according to region/zone/cluster/computer) may be sorted and arranged/ranked by increasing/decreasing order. The nodal redundancy software application 42 may then autonomously select its nodal host server 40 when its corresponding weighted hash value 104 satisfies some threshold value or rank. That is, if the weighted hash value 104 matches or equals some minimum rank or value, then the nodal redundancy software application 42 is authorized to store to, or evict from, its local memory device 44.

Examples of storage randomization are provided. Consider, for example, the under-replicated condition 70 (as explained with reference to FIGS. 5-6) where C<R. Because the electronic data 26 is under-replicated among the cloud computing nodes 30, the cloud redundancy storage policy 56 may specify that only those top/highest ranked cloud computing nodes 30 are eligible for storing the additional redundant copy 24. The cloud redundancy storage policy 56 may further specify that the R and C redundant copy counts must be dispersed/distributed across different region 50, zone 52, and/or cluster 54 assignments. The nodal redundancy software application 42 (hosted by the host server 40) may thus compare its corresponding hashing randomization feature 100 to the cloud redundancy storage policy 56 and to the ranked nodal hashing randomization features 100 to self-determine its eligibility to store the redundant copy 24. Similarly, in the over-replicated condition 74 (e.g., when C>R), the nodal redundancy software application 42 may consider its corresponding hashing randomization feature 100, the cloud redundancy storage policy 56, and the ranked nodal hashing randomization features 100 to self-determine its eligibility to evict its existing redundant copy 24.

The cloud computing network 28 thus automatically distributes one or more of the redundant copies 24 onto the cloud computing nodes 30. This data redundancy minimizes the risk of data loss while also not burdening the cloud computing network 28 with unnecessary packet traffic. Redundant files and other data are only transferred when necessary (for example, when C<R and destination eligible). Conventional schemes cause too much shuffling of data that clogs networks and is very costly (e.g., $/byte of network traffic). The global or overall cloud redundancy storage policy 56 may specify, for example, that for each segment (such as a data file that is required to have R copies of for resilience, with perhaps each redundant copy 24 in a unique or different zone 52). The cloud redundancy storage policy 56 may specify, and/or the nodal redundancy software application 42 may check, whether the segment, file, or other electronic data 26 is under-replicated (less than R copies exist) or over-replicated (more than R copies exist), if one of the servers (such as the cloud computing host 30) it resides on is being evicted from the cluster 54, if one of the servers it resides on has a lot more data on disk as a percentage of disk size than other servers, or if the set of servers it resides on has a sub-optimal zone distribution. Additionally, the cloud redundancy storage policy 56 may require, and/or the nodal redundancy software application 42 may determine, if the segment is present in bucket storage. The cloud redundancy storage policy 56 may require, and/or the nodal redundancy software application 42 may determine, whether the total amount of data is larger than the cluster 54 can hold. Then, depending on these cases, different nodal redundancy storage decisions 48 may be implemented. For example, if a segment is under-replicated and cluster disk space is available, then the hashing randomization feature 100 may be implemented to decide where the segment should be copied to. If the segment is over-replicated, however, then the redundant copy 24 must be removed from a host 30, and the chosen host 30 may be based on the zones 52 the hosts 30 reside in as well as how full their respective disks are. For example, of a host 30 is using a lot more data than others (or much less data than others), then segments may be moved from or to this host, perhaps again based on what impact moving the segment would have on the zone distribution for the replicas of that segment and which improves the disk balance of the cluster 54 the most. If our zoning is sub-optimal (meaning a segment is present in too few zones 52), then perhaps a segment is moved to another host 30 in order to increase zoning. These examples of data transfers may be performed while also keeping the disk balance of the cluster 54 in mind. In the eviction case, a host 30 may be marked for removal from the cluster 54, so the segment data must be moved off this host. This may be done for each segment on the host perhaps again by using the hashing randomization feature 100 to select the storage destination. All this is done without coordination between nodes 30, so if two servers arrive at different decisions then the first one wins. Doing all this in this way (rather than have an algorithm generate a layout), without any regard for the current segment distribution, means data is not moved unnecessarily, and network traffic is reduced.

Figure 15:
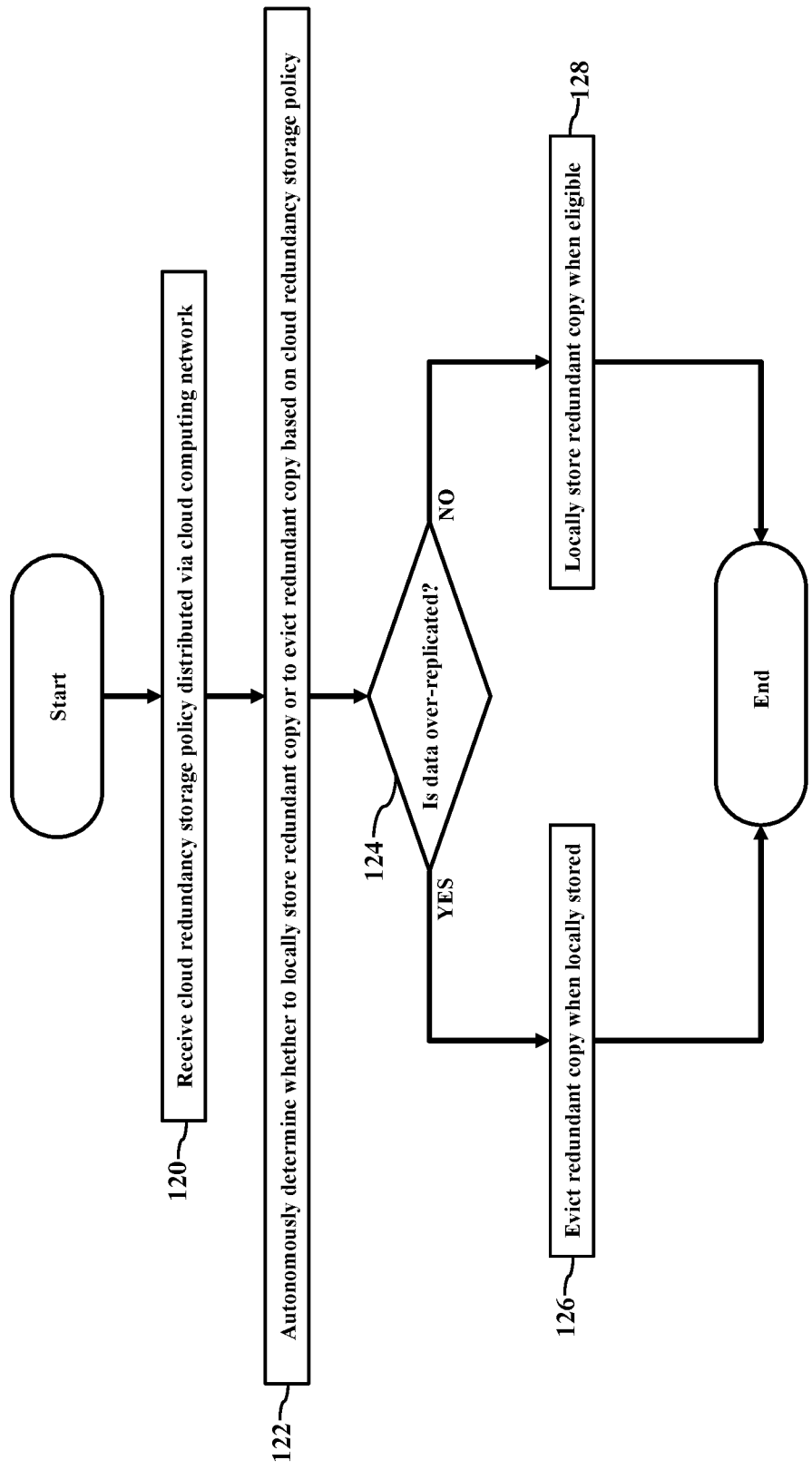
FIG. 15 illustrates examples of operations or methods that manage a redundant copy of electronic data.

FIG. 15 illustrates examples of operations or methods that manage the redundant copy 24 of the electronic data 26. The cloud computing node 30 (such as the computer system 20) receives the cloud redundancy storage policy 56 distributed via the cloud computing network 28 (Block 120). The cloud computing node 30 autonomously determines whether to locally store the redundant copy 24 or to evict the redundant copy 24 based on the cloud redundancy storage policy 56 (Block 122). If the electronic data 26 is over-replicated (Block 124), then the cloud computing node 30 evicts the redundant copy 24 when locally stored (Block 126). However, if the electronic data 26 is under-replicated (Block 124), then the cloud computing node 30 locally stores the redundant copy 24 when eligible (Block 128).

Figure 16:
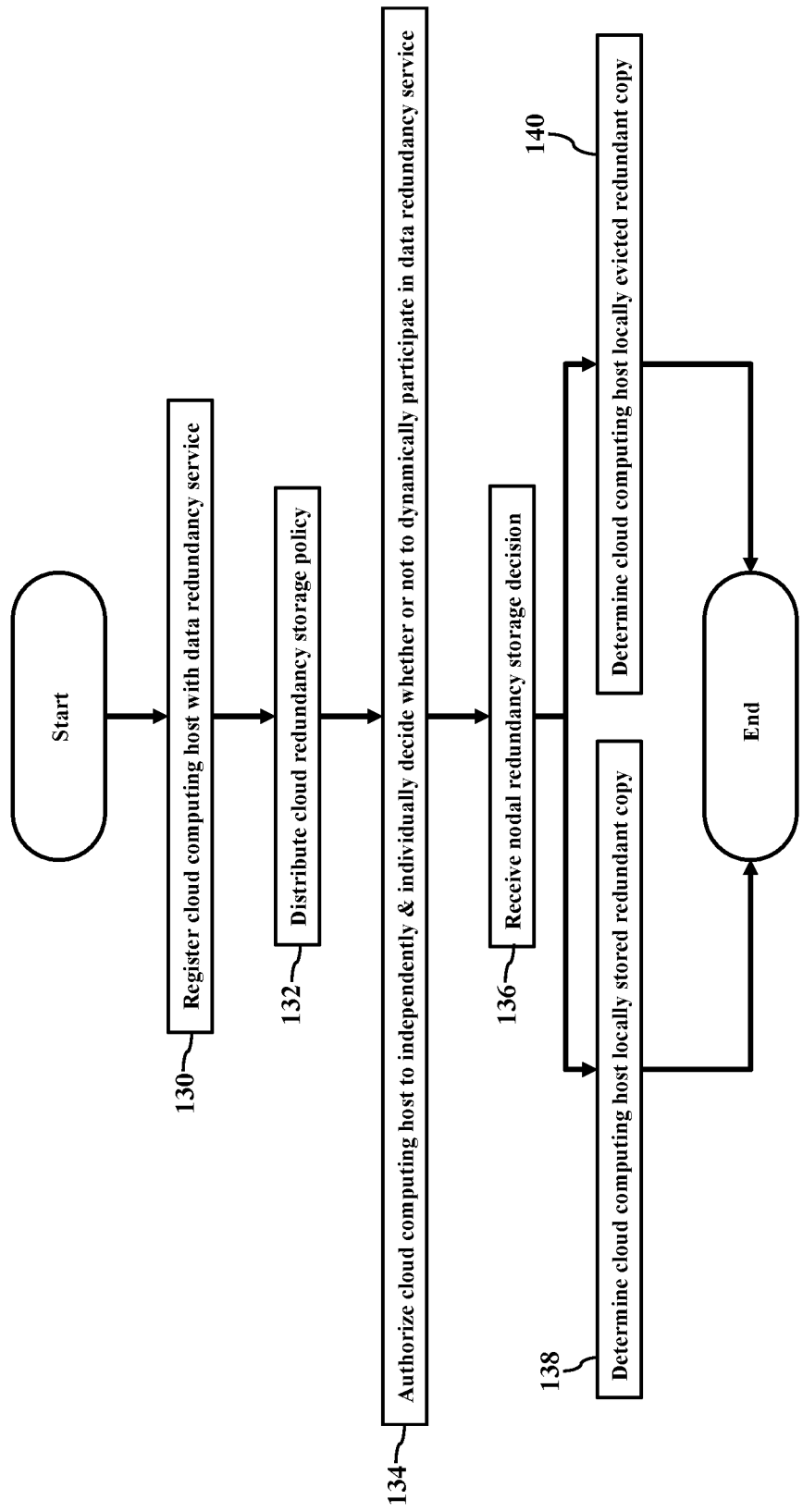
FIG. 16 illustrates more examples of operations or methods that manage the redundant copy of the electronic data.
Figure 17:
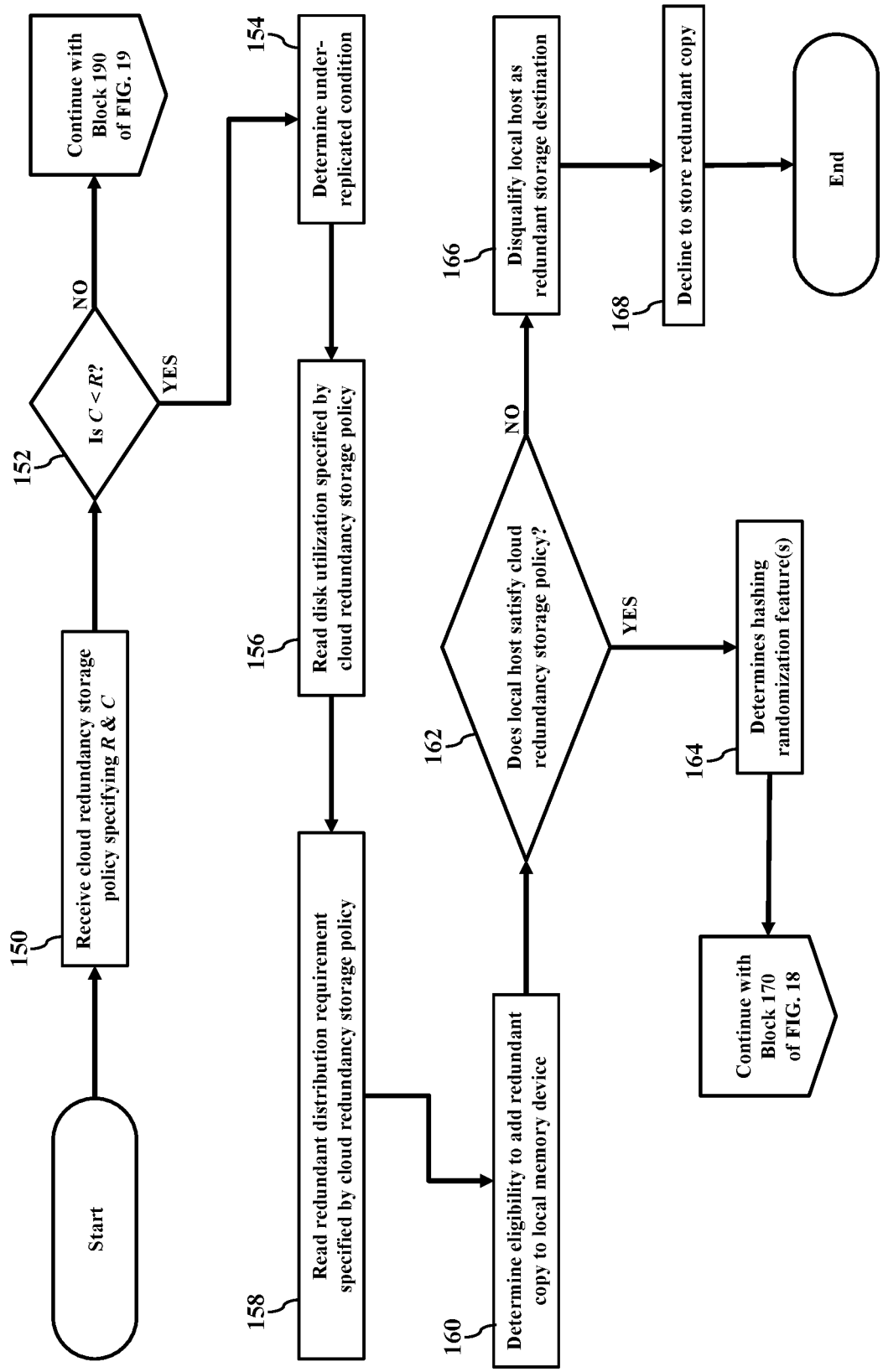
FIGS. 17-20 illustrate still more examples of operations or a method that improve(s) computer and network functioning by redundantly storing the redundant copy of the electronic data.

FIG. 16 illustrates more examples of operations or methods that manage the redundant copies 24 of the electronic data 26. The cloud computing network 28 (such as the cloud server 72) registers the cloud computing host 30 (such as the computer system 20) with the data redundancy service 22 (Block 130). The cloud computing network 28 distributes the cloud redundancy storage policy 56 to the cloud computing host(s) 30 associated with the data redundancy service 22 (Block 132). The cloud computing network 28 authorizes the cloud computing host 30 to independently and individually decide whether or not the cloud computing host 30 dynamically participates in the data redundancy service 22 (Block 134). The cloud computing network 28 receives the nodal redundancy storage decision 48 indicating that the cloud computing host 30 dynamically participated in the data redundancy service 22 (Block 136). The cloud computing network 28 determines, based on the nodal redundancy storage decision 48, that the cloud computing host 30 locally stored the redundant copy 24 (Block 138) or locally evicted the redundant copy 24 (Block 140) without consensus from the cloud computing network 28.

FIGS. 17-20 illustrate still more examples of operations or a method that improve(s) computer and network functioning by redundantly storing the redundant copy 24 of the electronic data 26. The cloud redundancy storage policy 56 is received that specifies how many redundant copies R are required and how many redundant copies C are currently stored by the cloud computing network 28 (Block 150). If C<R (Block 152), then the under-replicated condition 70 exists (Block 154). The disk utilization 80 specified by the cloud redundancy storage policy 56 is read (Block 156). The disk utilization 80 specifies the used disk space, available disk space, and/or maximum permissible disk space (in bytes) according to the region 50, zone 52, cluster 54, and/or the individual cloud computing node 30. A redundant distribution requirement (perhaps specified by the cloud redundancy storage policy 56) is read (Block 158). The redundant distribution requirement, for example, may specify which regions 40, zones 42, and/or clusters 44 exist and/or are eligible for the data redundancy service 22. The nodal redundancy software application 42 may determine its eligibility to add the redundant copy 24 to its local memory device 44 (Block 160). Because the under-replicated condition 70 exists, the nodal redundancy software application 42 must determine whether its local cloud computing host 30 (e.g., the server 40 or the local memory device 44) qualifies as a redundant storage destination by comparing its local memory space availability and its region/zone/cluster memory usage/availability to the disk utilization 80 and to the hierarchical redundant distribution requirement specified/required by the cloud redundancy storage policy 56. If the local cloud computing host 30 satisfies the cloud redundancy storage policy 56 (Block 162), then the nodal redundancy software application 42 determines the hashing randomization features 100 (Block 164) and the flowchart continues with FIG. 18. However, if the local cloud computing host 30 cannot meet or satisfy the cloud redundancy storage policy 56 (Block 162), then the local cloud computing host 30 is disqualified as the redundant storage destination (Block 166) and the nodal redundancy software application 42 declines to retrieve and store the redundant copy 24 (Block 168).

Figure 18:
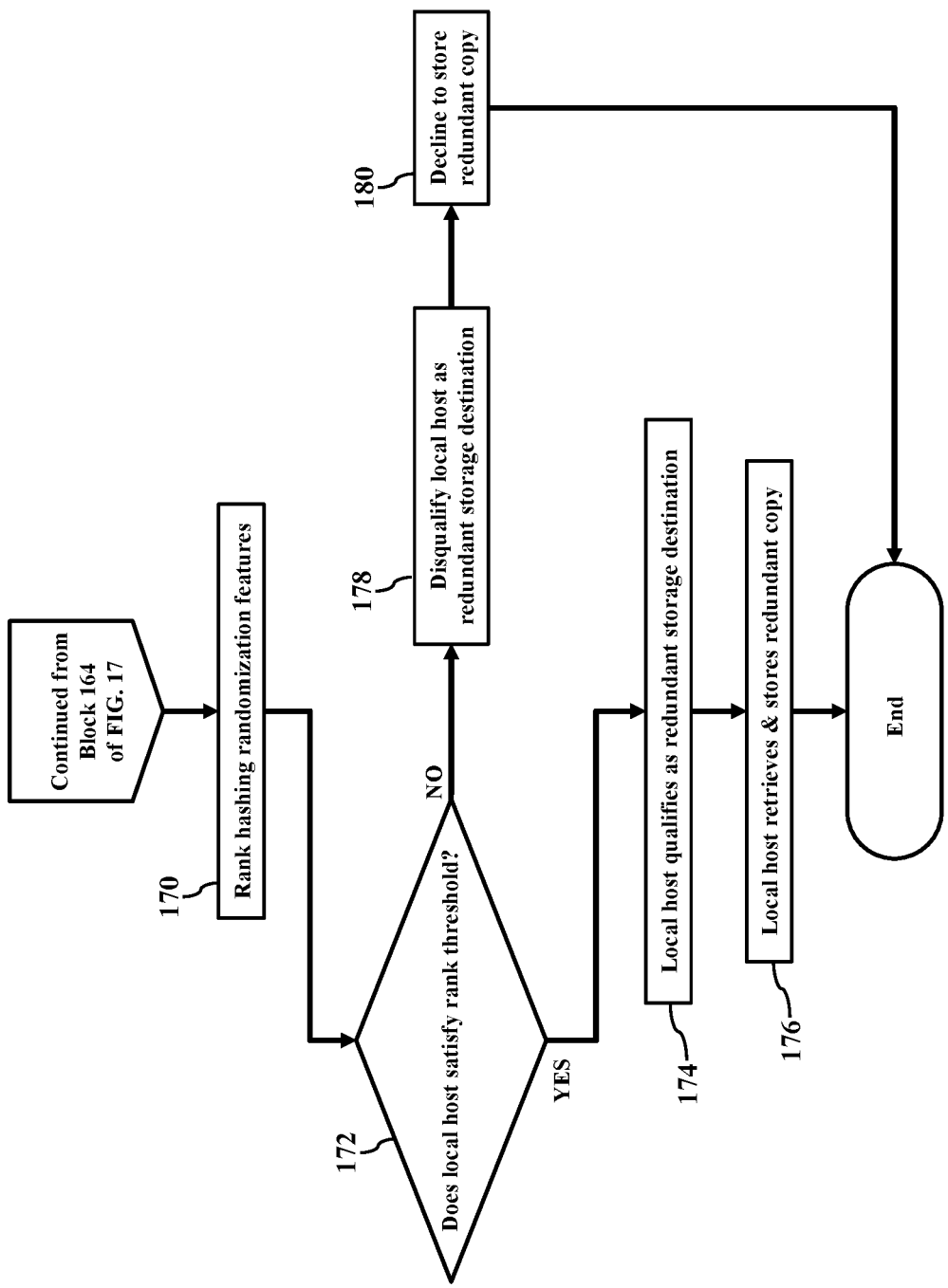

The flowchart continues with FIG. 18. Once the nodal redundancy software application 42 determines the hashing randomization features 100 (see Block 164 of FIG. 17), the nodal redundancy software application 42 ranks the hashing randomization features 100 associated with each cloud computing node 30 (Block 170). If the host server 40 satisfies a threshold value (such as a max/min rank or value) (perhaps as specified by the cloud redundancy storage policy 56) (Block 172), then the local host server 40 qualifies as the redundant storage destination (Block 174) and the nodal redundancy software application 42 instructs its host server 40 to retrieve and store the redundant copy 24 (Block 176). However, if the local host server 40 fails to satisfy the threshold value (Block 172), then the local host server 40 is disqualified as the redundant storage destination (Block 178) and the nodal redundancy software application 42 declines to retrieve and store the redundant copy 24 (Block 180).

Figure 19:
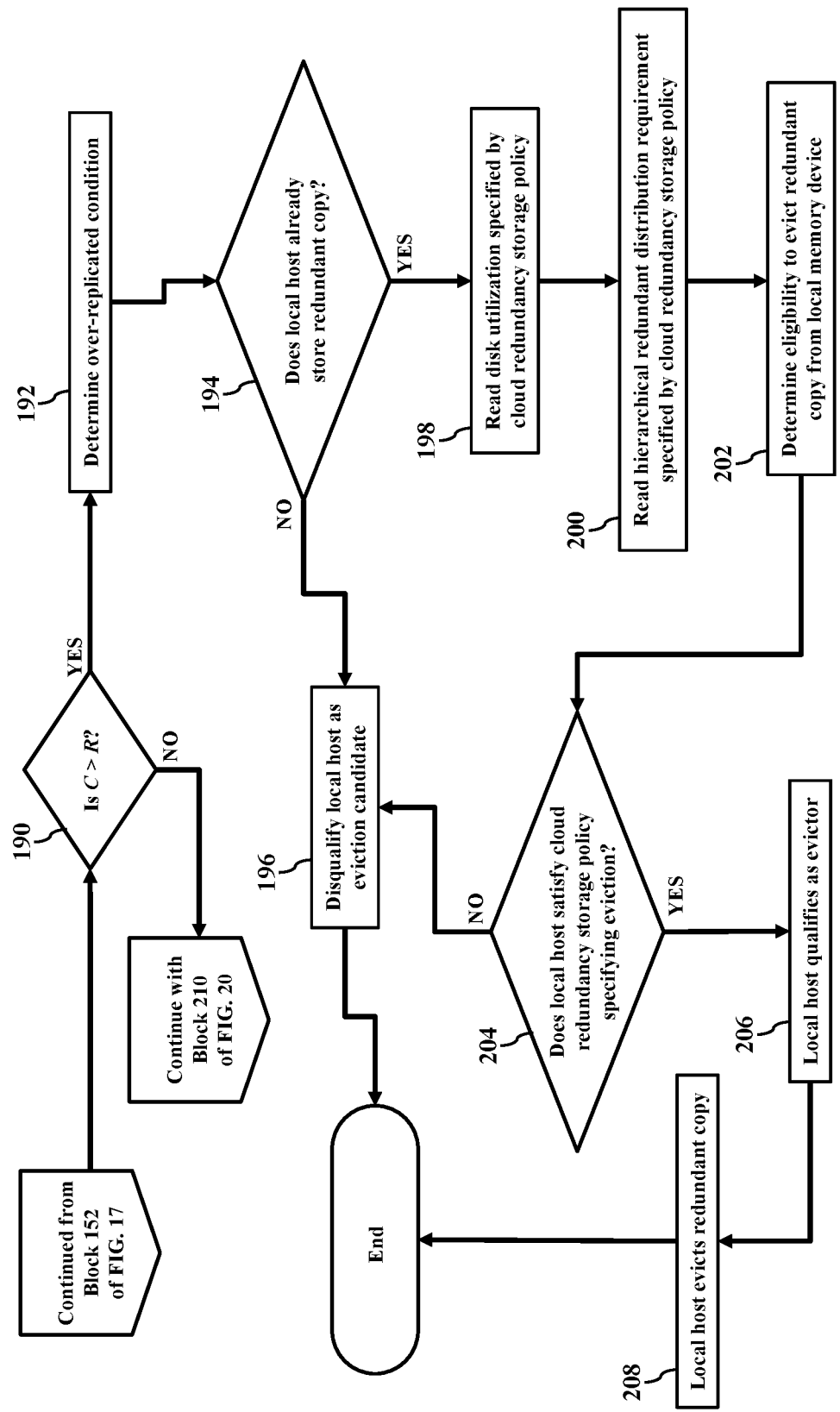

The flowchart continues with FIG. 19 and the over-replicated condition 74. When C is not less than R (see Block 152 of FIG. 17), and when C>R (Block 190), then nodal redundancy software application 42 determines the over-replicated condition 74 (Block 192). However, if C is not greater than R (Block 190), then the flowchart continues with Block 210 of FIG. 20. In FIG. 19, though, because C>R, the nodal redundancy software application 42 determines that at least one of the redundant copies C that is currently stored by the cloud computing network 28 must be evicted or deleted. The nodal redundancy software application 42 determines whether its local cloud computing host 30 (e.g., the nodal server 40 and/or the local memory device 44) already locally stores the redundant copy 24 (Block 194). The nodal redundancy software application 42 may merely cooperate with its operating system to search the local memory device 44 for a filename or other identifier associated with the redundant copy 24. The nodal redundancy software application 42 may additionally or alternative inspect the cloud redundancy storage policy 56 for its own network location (e.g., IP address) as one of the currently stored redundant copies C. However the local storage is determined, local storage may be a first criterion or check. After all, if the cloud computing host 30 does not locally store the redundant copy 24 (Block 194), then the cloud computing host 30 is disqualified (Block 196). There is nothing to evict, in other words, so the cloud computing host 30 cannot satisfy the cloud redundancy storage policy 56. However, if the local host server 40 does locally store the redundant copy 24 (Block 194), the parameters and rules associated with the disk utilization 80 (Block 198) and with the hierarchical redundant distribution requirement (Block 200) (specified by the cloud redundancy storage policy 56) are read. Because the over-replicated condition 74 exists, the nodal redundancy software application 42 must determine whether its cloud computing host 30 qualifies as a redundant storage evictor (Block 204). The nodal redundancy software application 42, for example, may compare its local memory space availability and its region/zone/cluster memory usage/availability to the disk utilization 80 and to the hierarchical redundant distribution requirement specified/required by the cloud redundancy storage policy 56. If the local host server 40 satisfies the cloud redundancy storage policy 56 specifying eligibility to evict (Block 204), then the local host server 40 qualifies as the redundant storage evictor (Block 206) and the nodal redundancy software application 42 instructs its host server 40 to delete or overwrite the locally stored redundant copy 24 (Block 208). However, if the local host server 40 cannot meet or satisfy the cloud redundancy storage policy 56 specifying eligibility to evict (Block 204), then the local host server 40 is disqualified as the redundant storage evictor (Block 196) and the nodal redundancy software application 42 declines to delete or overwrite the locally stored redundant copy 24.

Figure 20:
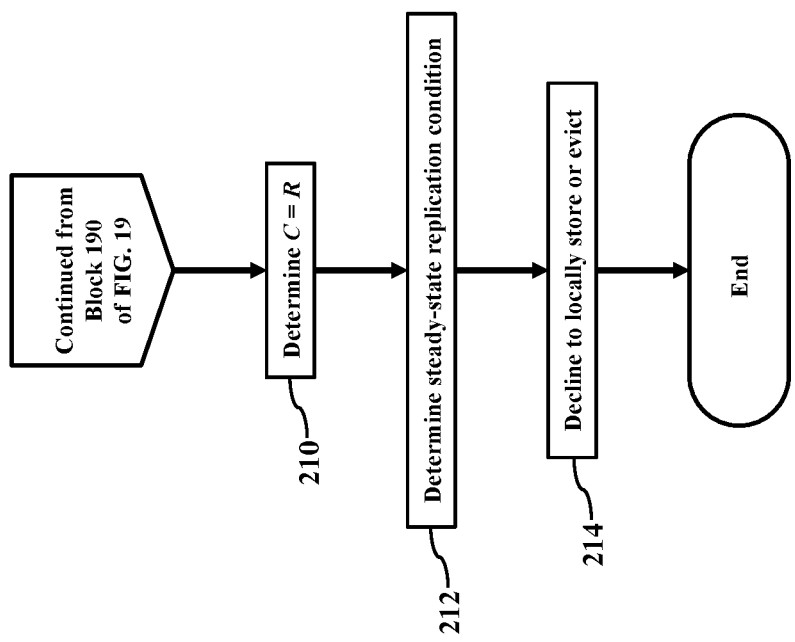

The flowchart continues with FIG. 20 and the balanced equilibrium. When C=R (see Block 190 of FIG. 19), the nodal redundancy software application 42 determines that the current count C of the duplicate copies is equal to the required number R (Block 210). Because C=R, the nodal redundancy software application 42 determines the steady-state replication condition 76 (Block 212) and takes no action. The nodal redundancy software application 42 declines to add or evict (Block 214).

Figure 21:
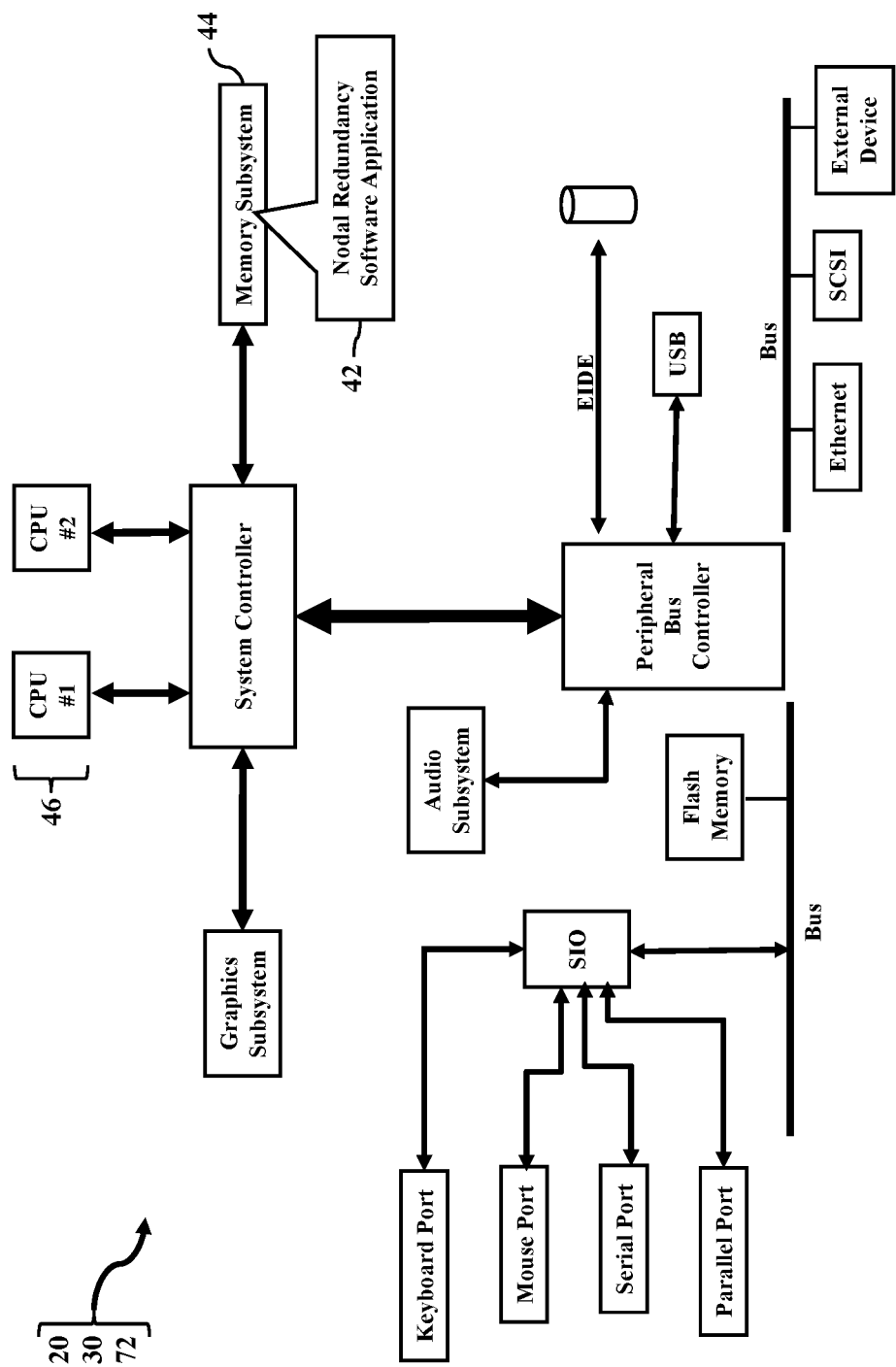
FIG. 21 illustrates a more detailed example of the operating environment.

FIG. 21 illustrates a more detailed example of the operating environment. FIG. 21 is a more detailed block diagram illustrating the computer system 20 and the cloud computing node 30 of the cloud computing network 28. The nodal redundancy software application 42 is stored in the memory subsystem or device 44. One or more of the processors 46 communicate with the memory subsystem or device 44 and execute the nodal redundancy software application 42. Examples of the memory subsystem or device 44 may include Dual In-Line Memory Modules (DIMMs), Dynamic Random Access Memory (DRAM) DIMMs, Static Random Access Memory (SRAM) DIMMs, non-volatile DIMMs (NV-DIMMs), storage class memory devices, Read-Only Memory (ROM) devices, compact disks, solid-state, and any other read/write memory technology.

The computer system 20 and the cloud computing node 30 may have any embodiment. As this disclosure explains, the computer system 20 and the cloud computing node 30 may be embodied as any processor-controlled information handling system. The computer system 20 and the cloud computing node 30 may be embodied as a server, a switch, a router, a storage component, and/or a management component. The computer system 20 and the cloud computing node 30 may also be embodied as a smartphone, a tablet computer, a smartwatch, a television, an audio device, a remote control, and/or a recorder. The computer system 20 and the cloud computing node 30 may also be embodied as a smart appliance, such as washers, dryers, and refrigerators. Indeed, as cars, trucks, and other vehicles grow in electronic usage and in processing power, the nodal redundancy software application 42 may be easily incorporated into any vehicular controller.

The above examples of nodal redundancy storage decisions 48 may be applied regardless of the networking environment. The nodal redundancy software application 42 may be easily adapted to execute in stationary or mobile devices having wide-area networking (e.g., 4G/LTE/5G cellular), wireless local area networking (WI-FI®), near field, and/or BLUETOOTH® capability. The nodal redundancy software application 42 may be applied to stationary or mobile devices utilizing any portion of the electromagnetic spectrum and any signaling standard (such as the IEEE 802 family of standards, GSM/CDMA/TDMA or any cellular standard, and/or the ISM band). The nodal redundancy software application 42 however, may be applied to any processor-controlled device operating in the radio-frequency domain and/or the Internet Protocol (IP) domain. The examples may be applied to any processor-controlled device utilizing a distributed computing network, such as the Internet (sometimes alternatively known as the "World Wide Web"), an intranet, a local-area network (LAN), and/or a wide-area network (WAN). The examples may be applied to any processor-controlled device utilizing power line technologies, in which signals are communicated via electrical wiring. Indeed, the many examples may be applied regardless of physical componentry, physical configuration, or communications standard(s).

The computer system 20 and the cloud computing node 30 may utilize any processing component, configuration, or system. For example, the examples may be easily adapted to any desktop, mobile, or server central processing unit, graphics processor, ASIC, or chipset offered by INTEL®, ADVANCED MICRO DEVICES®, ARM®, APPLE®, TAIWAN SEMICONDUCTOR MANUFACTURING®, QUALCOMM®, or any other manufacturer. The computer system 20 and the cloud computing node 30 may even use multiple central processing units or chipsets, which could include distributed processors or parallel processors in a single machine or multiple machines. The central processing unit or chipset can be used in supporting a virtual processing environment. The central processing unit or chipset could include a state machine or logic controller. When any of the central processing units or chipsets execute instructions to perform "operations," this could include the central processing unit or chipset performing the operations directly and/or facilitating, directing, or cooperating with another device or component to perform the operations.

The examples may inspect packetized communications. When the computer system 20 and the cloud computing node 30 communicates via any communications network, information may be collected, sent, and retrieved. The information may be formatted or generated as packets of data according to a packet protocol (such as the Internet Protocol). The packets of data contain bits or bytes of data describing the contents, or payload, of a message. A header of each packet of data may be read or inspected and contain routing information identifying an origination address and/or a destination address.

The examples may utilize any signaling standard. The cloud computing network 28, for example, may mostly use wired networks to interconnect the cloud computing nodes 30. However, the cloud computing network 28 may utilize any communications device using the Global System for Mobile (GSM) communications signaling standard, the Time Division Multiple Access (TDMA) signaling standard, the Code Division Multiple Access (CDMA) signaling standard, the "dual-mode" GSM-ANSI Interoperability Team (GAIT) signaling standard, or any variant of the GSM/CDMA/TDMA signaling standard. The cloud computing network 28 may also utilize other standards, such as the I.E.E.E. 802 family of standards, the Industrial, Scientific, and Medical band of the electromagnetic spectrum, BLUETOOTH®, low-power or near-field, and any other standard or value.

The nodal redundancy software application 42 may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for generating the nodal redundancy storage decisions 48, as the above paragraphs explain.

The diagrams, schematics, illustrations, and the like represent conceptual views or processes illustrating examples of the nodal redundancy storage decisions 48. The functions of the various elements shown in the figures may be provided through the use of dedicated hardware as well as hardware capable of executing instructions. The hardware, processes, methods, and/or operating systems described herein are for illustrative purposes and, thus, are not intended to be limited to any particular named manufacturer or service provider.

As used herein, the singular forms "a," "an," and "the" are intended to include the plural forms as well, unless expressly stated otherwise. It will be further understood that the terms "includes," "comprises," "including," and/or "comprising," when used in this Specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, and so on, may be used herein to describe various elements, these elements should not be limited by these terms. These terms are only used to distinguish one element from another. For example, a first computer or container could be termed a second computer or container and, similarly, a second device could be termed a first device without departing from the teachings of the disclosure.

The invention claimed is:

1. A method executed by a computer system that manages a redundant copy of an electronic data, comprising:
receiving, by the computer system having a local memory device installed therein, a cloud redundancy storage policy distributed via a cloud computing network to cloud computing nodes providing a data redundancy service; autonomously determining, by the computer system operating as one of the cloud computing nodes providing the data redundancy service, whether to locally store the redundant copy or to locally evict the redundant copy based on the cloud redundancy storage policy;
if the local memory device does not store a copy of the electronic data, then autonomously generating, by the computer system without consensus of the cloud computing nodes, a nodal redundancy storage decision to store the redundant copy to the local memory device; and
if the local memory device stores the redundant copy, then autonomously generating, by the computer system without the consensus of the cloud computing nodes, the nodal redundancy storage decision to evict the redundant copy.

2. The method of claim 1, further comprising determining, by the computer system, that the electronic data is over-replicated among the cloud computing nodes providing the data redundancy service.

3. The method of claim 2, wherein in response to the determining that the electronic data is over-replicated, further comprising evicting the redundant copy when locally stored by the computer system.

4. The method of claim 1, further comprising determining, by the computer system, that the electronic data is under-replicated among the cloud computing nodes providing the data redundancy service.

5. The method of claim 4, wherein in response to the determining that the electronic data is under-replicated, further comprising locally storing the redundant copy by the computer system.

6. The method of claim 1, further comprising determining, by the computer system, an eligibility to locally provide the data redundancy service based on the cloud redundancy storage policy.

7. The method of claim 1, further comprising determining, by the computer system, that a local memory device already stores a copy of the electronic data.

8. The method of claim 7, wherein in response to the determining that the local memory device already stores the copy of the electronic data, further comprising declining to locally store the redundant copy.

9. The method of claim 1, further comprising determining, by the computer system, that a local memory device fails to store a copy of the electronic data.

10. The method of claim 9, wherein in response to the determining that the local memory device fails to store the copy of the electronic data, further comprising declining to evict the redundant copy.

11. A computer system that manages a redundant copy of an electronic data, comprising:
   at least one central processing unit; and
   at least one local memory device storing instructions that, when executed by the at least one central processing unit, perform operations, the operations comprising:
   receiving a cloud redundancy storage policy specified by a cloud computing network providing a data redundancy service;
   acting with a redundancy free will by locally evaluating a service eligibility associated with the data redundancy service;
   if the local memory device does not locally store a copy of the electronic data, then autonomously generating a nodal redundancy storage decision without consensus whether to locally store the redundant copy based on the cloud redundancy storage policy; and
   if the local memory device locally stores the redundant copy, then autonomously generating the nodal redundancy storage decision without the consensus whether to locally evict the redundant copy from the local memory device based on the cloud redundancy storage policy.

12. The computer system of claim 11, wherein the operations further comprise determining that the electronic data is over-replicated by the cloud computing network providing the data redundancy service.

13. The computer system of claim 12, wherein in response to the determining that the electronic data is over-replicated, the operations further comprise evicting the redundant copy locally stored by the computer system.

14. The computer system of claim 11, wherein the operations further comprise determining that the electronic data is under-replicated by the cloud computing network providing the data redundancy service.

15. The computer system of claim 14, wherein in response to the determining that the electronic data is under-replicated, further comprising locally storing the redundant copy.

16. The computer system of claim 11, wherein the operations further comprise locally storing the redundant copy to the local memory device.

17. The computer system of claim 11, wherein the operations further comprise locally evicting the redundant copy from the local memory device.

18. A non-transitory memory device storing instructions that, when executed by a central processing unit, perform operations that manage a redundant copy of an electronic data, the operations comprising:
   registering a cloud computing host with a decentralized data redundancy service provided by a cloud computing network;
   distributing a decentralized cloud redundancy storage policy associated with the decentralized data redundancy service;
   authorizing a redundancy free will by locally allowing the cloud computing host to independently and dynamically decide to participate in the decentralized data redundancy service based on the decentralized cloud redundancy storage policy; and
   receiving a nodal redundancy storage decision generated by the cloud computing host having the redundancy free will, the nodal redundancy storage decision requesting an authorization to at least one of locally write or locally evict the redundant copy of the electronic data according to the decentralized data redundancy service.

19. The non-transitory memory device of claim 18, wherein the operations further comprise dispersing the nodal redundancy storage decision generated by the cloud computing host having the redundancy free will to other cloud computing hosts participating in the decentralized data redundancy service.

20. The non-transitory memory device of claim 18, wherein the operations further comprise authorizing the locally write of the redundant copy by comparing a pre-write state to a locally stored data redundancy inventory.

* * * * *

UNITED STATES PATENT AND TRADEMARK OFFICE
CERTIFICATE OF CORRECTION

| | | |
|---|---|---|
| PATENT NO. | : 12,361,017 B2 | Page 1 of 1 |
| APPLICATION NO. | : 18/460785 | |
| DATED | : July 15, 2025 | |
| INVENTOR(S) | : Døssing et al. | |

It is certified that error appears in the above-identified patent and that said Letters Patent is hereby corrected as shown below:

In the Claims

Column 24, Claim 7, Lines 59 & 60 should read as follows:
The method of claim 1, further comprising determining, by the computer system, that the local memory device already stores the copy of the electronic data.

Column 24, Claim 9, Lines 66 & 67 should read as follows:
The method of claim 1, further comprising determining, by the computer system, that the local memory device fails to store the copy of the electronic data.

Signed and Sealed this
Ninth Day of September, 2025

Coke Morgan Stewart
*Acting Director of the United States Patent and Trademark Office*